(12) United States Patent
Ishii

(10) Patent No.: US 7,583,450 B2
(45) Date of Patent: Sep. 1, 2009

(54) ZOOM LENS

(75) Inventor: Atsujiro Ishii, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/150,902

(22) Filed: Apr. 30, 2008

(65) Prior Publication Data

US 2008/0291545 A1 Nov. 27, 2008

(30) Foreign Application Priority Data

May 22, 2007 (JP) .............................. 2007-135425

(51) Int. Cl.
*G02B 15/14* (2006.01)
(52) U.S. Cl. ...................... 359/687; 359/686
(58) Field of Classification Search .............. 359/686, 359/687, 684
See application file for complete search history.

(56) References Cited

U.S. PATENT DOCUMENTS

| | | | |
|---|---|---|---|
| 6,259,508 B1 * | 7/2001 | Shigematsu | 355/53 |
| 7,268,811 B2 * | 9/2007 | Shirasuna | 348/240.3 |
| 7,277,235 B2 * | 10/2007 | Sensui | 359/687 |
| 7,420,745 B2 * | 9/2008 | Ohashi | 359/687 |

FOREIGN PATENT DOCUMENTS

| | | |
|---|---|---|
| JP | 11-142740 | 5/1999 |
| JP | 2000-321497 | 11/2000 |
| JP | 2001-208970 | 8/2001 |

* cited by examiner

*Primary Examiner*—Timothy J Thompson
(74) *Attorney, Agent, or Firm*—Kenyon & Kenyon LLP

(57) ABSTRACT

The invention relates to a zoom lens that can achieve higher performance easily. In order from the object side of the zoom lens, it comprises a positive first lens group G1, a negative second lens group G2, a positive third lens group G3 and a positive fourth lens group G4, wherein zooming is implemented by a change in the space between the respective lens groups. Upon zooming from the wide-angle end to the telephoto end, while the space between the first lens group G1 and the second lens group G2 grows wide, the space between the second lens group G2 and the third lens group G3 becomes narrow and the space between the third lens group G3 and the fourth lens group G4 becomes narrow, the first, the third, and the fourth lens group moves toward the object side only, and the second lens group G2 moves in a convex orbit toward the image plane side. The second lens group G2, and the fourth lens group G4 has at least one aspheric surface, and the zoom lens satisfies the following conditions: $0.1<|f_2/f_1|<0.14$ and $0.1<|f_4/f_3|<0.6$ where fi is the focal length of an i-th lens group.

11 Claims, 13 Drawing Sheets

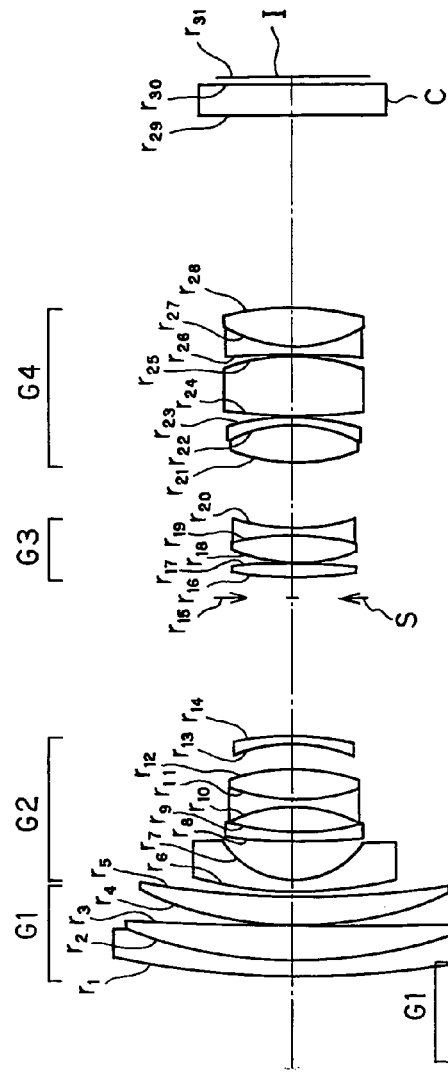
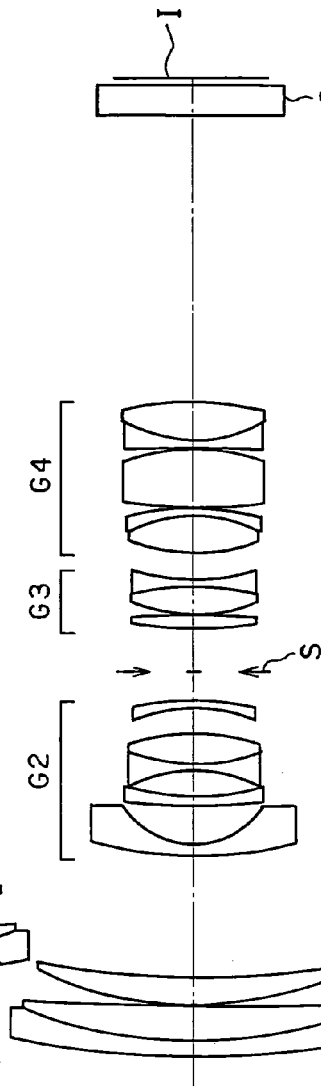
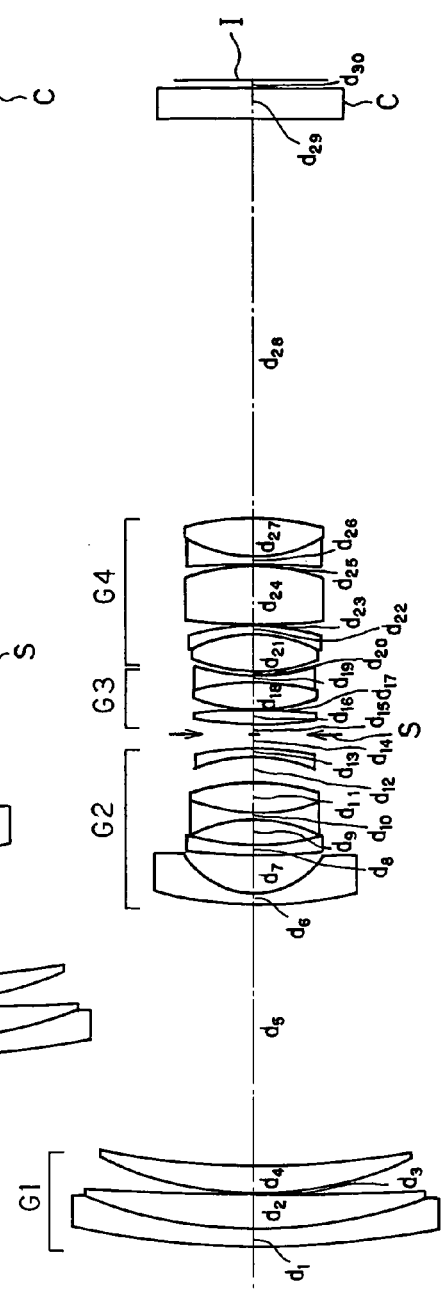
FIG. 2(a)
FIG. 2(b)
FIG. 2(c)

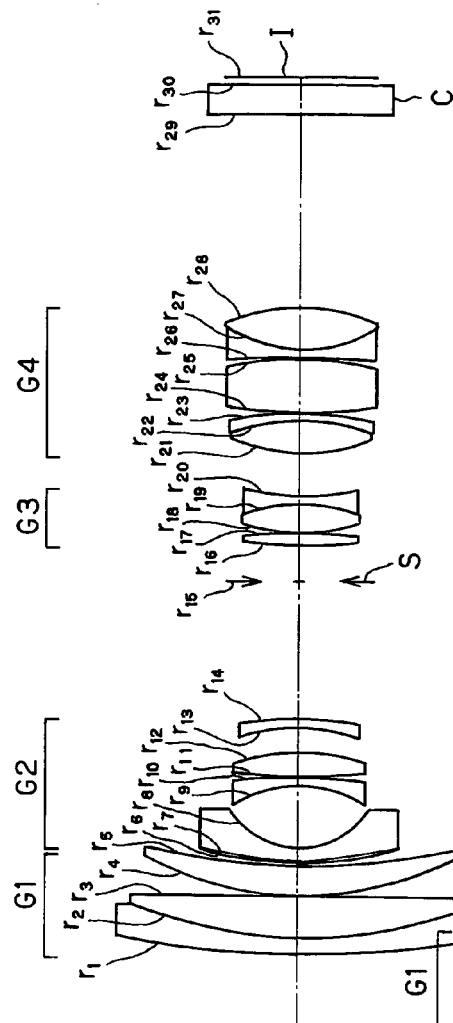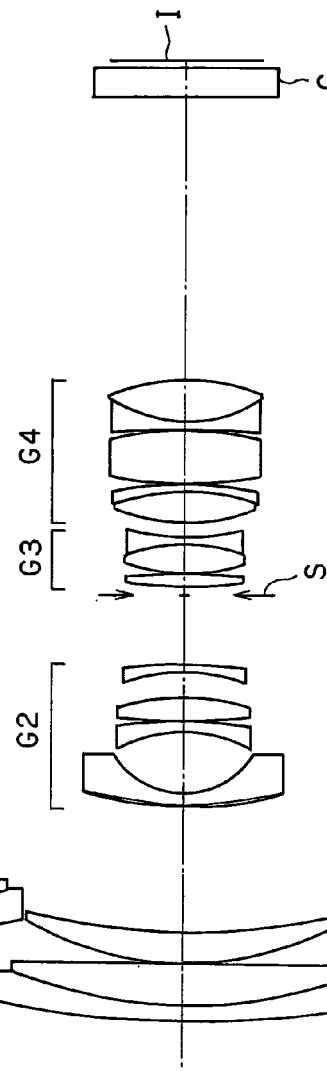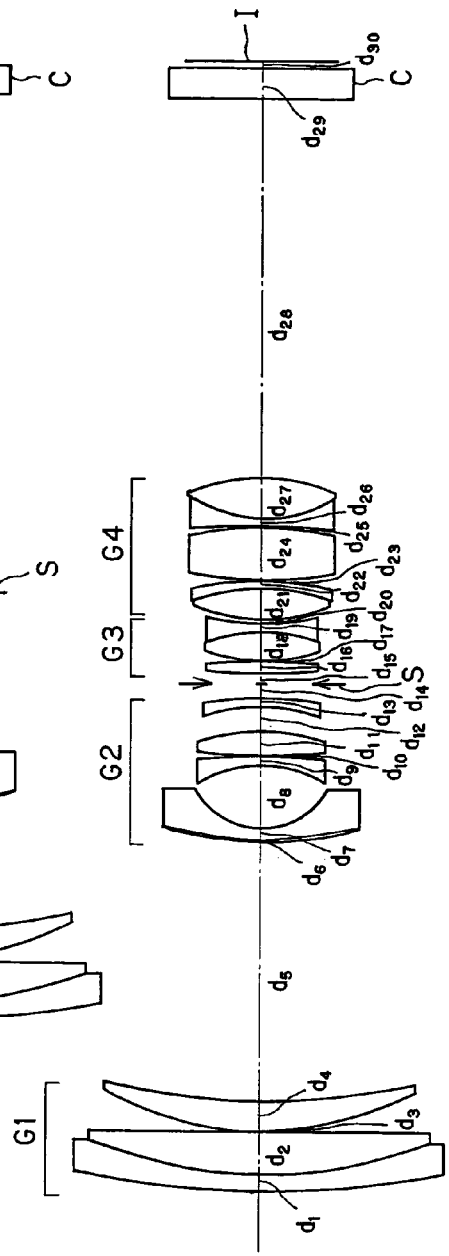
FIG. 3(a)
FIG. 3(b)
FIG. 3(c)

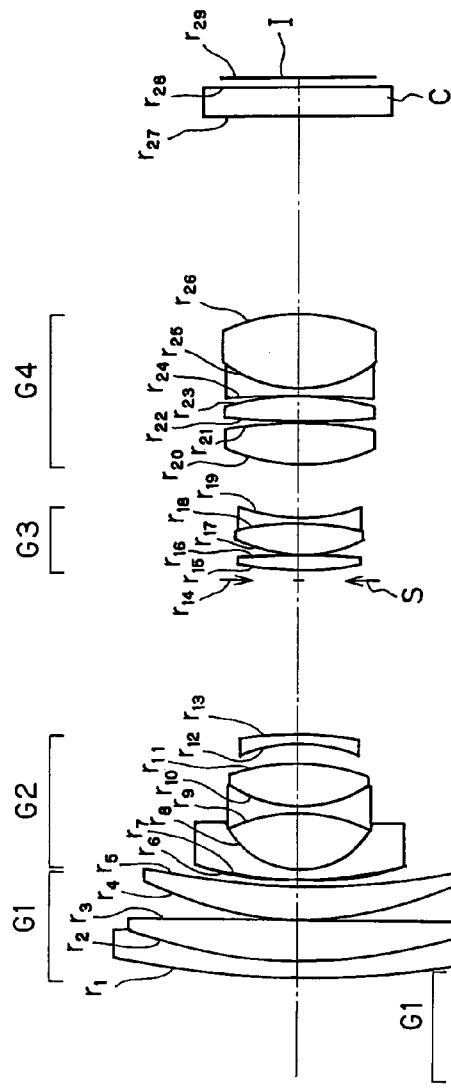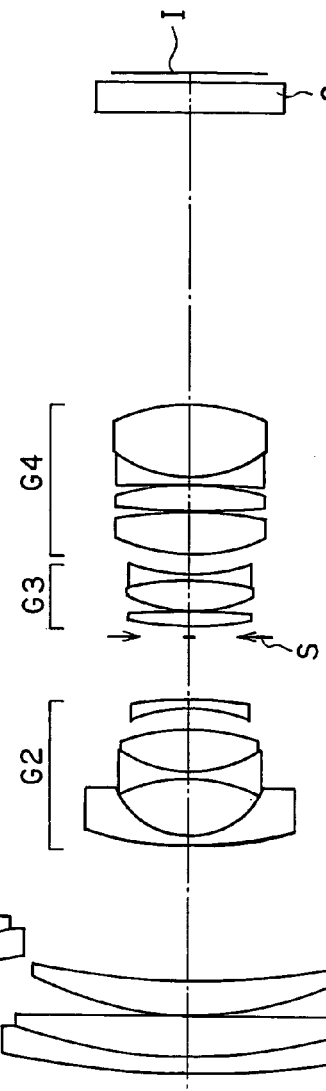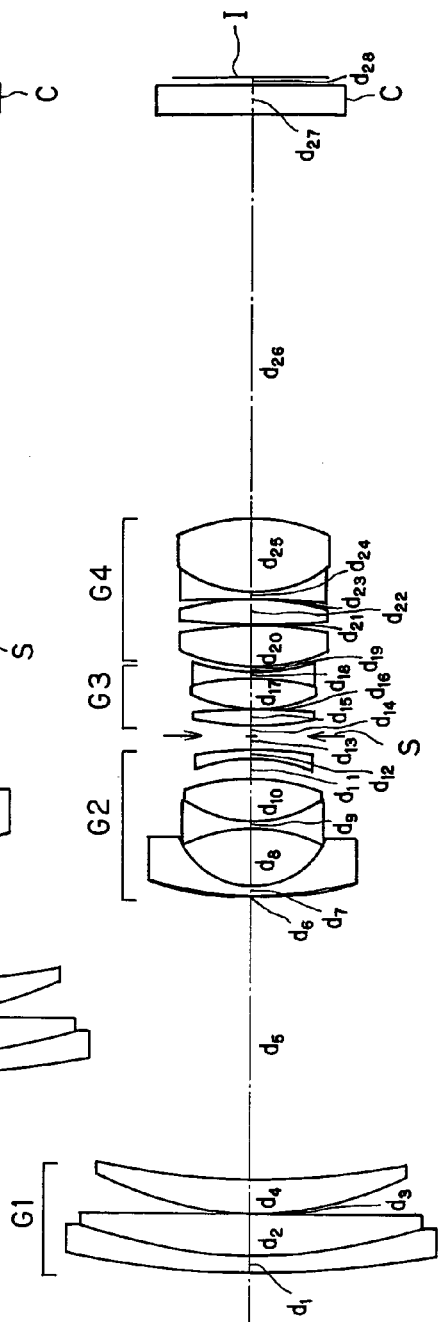
FIG. 4(a)
FIG. 4(b)
FIG. 4(c)

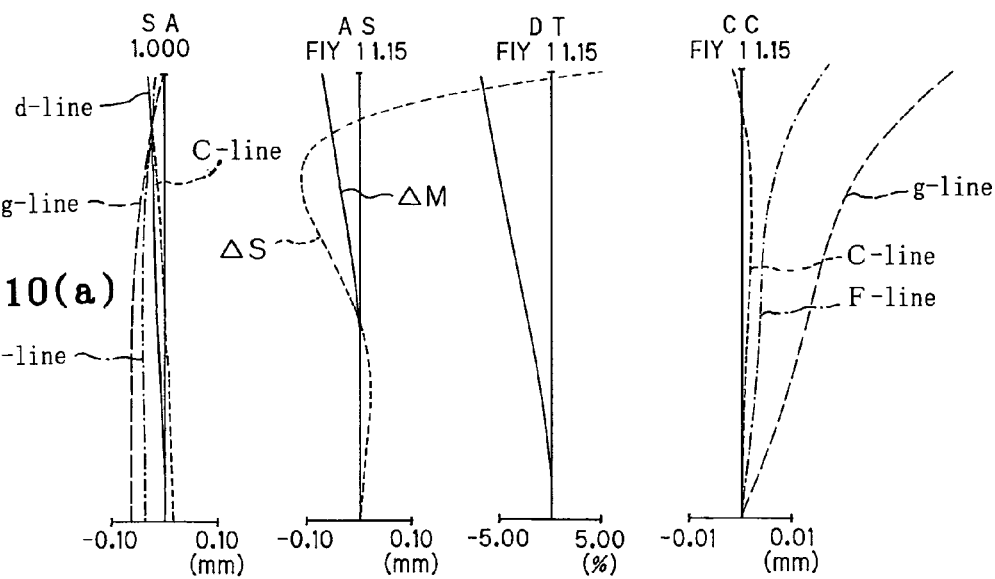

ZOOM LENS

BACKGROUND OF THE INVENTION

The present invention relates generally to a zoom lens, and more particularly to a zoom lens that covers a mid-to-full telephoto area used for interchangeable lenses for single-lens reflex cameras, etc., and has a relatively high zoom ratio.

Among zoom lenses that cover a focal length region from the wide-angle area to the mid-to-full telephoto area used for interchangeable lenses for single-lens reflex cameras or the like and have a zoom ratio of 3 or more, there is already a zoom lens comprising, in order from its object side, a first lens group having positive refracting power, a second lens group having negative refracting power, a third lens group having positive refracting power and a fourth lens group having positive refracting power, as known from Patent Publications 1, 2 and 3 or the like. Possible reasons for such arrangement are that higher zoom rations are easily achievable; the positive group in front permits the total length of the zoom lens to be curtailed; and so on.

Patent Publication 1
JP(A)11-142740
Patent Publication 2
JP(A)2000-321497
Patent Publication 3
JP(A)2001-208970

With the spread of digital single-lens reflex cameras, on the other hand, there is now a growing demand for an interchangeable lens optimized to cameras that comprise an imaging device having an image circle smaller than that of silver halide 35-mm film or the like. The interchangeable lens for such digital cameras should have a resolving power higher than demanded for interchangeable lenses for conventional silver halide 35-mm film and a more limited tolerance for chromatic aberrations. Moreover, the proportion of the back focus relative to the focal length of the whole system must be large: generally, there must be a lot more of retrofocus power profile.

As for zoom lens specifications, there are mounting demands for higher zoom ratios, larger aperture ratios, wider-angle arrangement, reductions in the closest object distance, etc., and with them, a sensible tradeoff between size reductions and cost reductions is in great need as well.

The situation being like such, the invention has for its object to the provision of a zoom lens that can easily achieve higher performance than ever before.

SUMMARY OF THE INVENTION

According to one aspect of the invention, there is a zoom lens provided, which comprises, in order from its object side, a first lens group having positive refracting power, a second lens group having negative refracting power, a third lens group having positive refracting power and a fourth lens group having positive refracting power, wherein zooming is implemented by changing the space between the respective lens groups, characterized in that:

upon zooming from the wide-angle end to the telephoto end, while the space between the first lens group and the second lens group grows wide, the space between the second lens group and the third lens group becomes narrow and the space between the third lens group and the fourth lens group becomes narrow, the first, the third, and the fourth lens group moves toward the object side only, the second lens group moves in a convex orbit toward the image plane side, and the second lens group, and the fourth lens group has at least one aspheric surface, with the satisfaction of the following conditions:

$$0.1 < |f_2/f_1| < 0.14 \tag{1}$$

$$0.1 < |f_4/f_3| < 0.6 \tag{2}$$

where $f_i$ is the focal length of an i-th lens group.

The advantages of, and the requirements for, such arrangement are now explained.

For a zoom lens for digital cameras wherein the proportion of the back focus needed relative to the focal length remains large as already noted, it is required that the power profile for the so-called retrofocus be tighter. At the same time, to offer a sensible tradeoff between having high zoom ratios and wider-angle arrangement at the wide-angle end and demands for size reductions, etc., it is necessary to increase the power of each lens group. However, there are large amounts of aberrations occurring, too. For instance, when there is a wide-angle zone included in the focal length range, it is difficult to correct distortion and astigmatism in particular. The aspheric surface in the second lens group is primarily effective for the correction of distortion and astigmatism at the wide-angle end, and the aspheric surface in the fourth lens group is effective for the correction of astigmatism and coma all over the zooming zone.

Condition (1) defines the ratio of the power of the first lens group to the power of the second lens group, and as the power of the first lens group grows stronger than the upper limit of 0.14 to condition (1), it renders it difficult to make sure the necessary back focus. It also causes the distance of an entrance pupil from an entrance surface in the first lens group to grow long, resulting in much difficulty in balancing the wide-angle arrangement at the wide-angle end against the size reductions of the front lens. As the power of the first lens group becomes less than the lower limit of 0.1 to condition (1), it causes the zoom ratio of the second lens group to become low, rendering it difficult to make sure the zoom ratio of the whole system and curtail the total length of the lens arrangement.

Condition (2) defines the ratio of the power of the third lens group to the power of the fourth lens, and as the power of the third lens group grows stronger than the upper limit of 0.6 to condition (2), it renders it difficult to make sure the necessary back focus. As the power of the third lens group becomes smaller than the lower limit of 0.1 to condition (2), it is not preferable because astigmatism and coma occur in too large amounts at the fourth lens group, and there are large astigmatism fluctuations during zooming as well.

According to another aspect of the invention, there is a zoom lens provided, which comprises, in order from its object side, a first lens group having positive refracting power, a second lens group having negative refracting power, a third lens group having positive refracting power and a fourth lens group having positive refracting power, wherein zooming is implemented by changing the space between the respective lens groups, characterized in that:

upon zooming from the wide-angle end to the telephoto end, while the space between the first lens group and the second lens group grows wide, the space between the second lens group and the third lens group becomes narrow and the space between the third lens group and the fourth lens group becomes narrow, the first, the third, and the fourth lens group moves toward the object side only, the second lens group moves in a convex orbit toward the image plane side; the second lens group, and the fourth lens group has at least one aspheric surface; and at least one negative lens in the second lens group, and at least one positive lens in the fourth lens group is made of a material that satisfies the following conditions:

$$n_d > 1.4 \quad (3)$$

$$v_d > 80 \quad (4)$$

where $n_d$ is a d-line refractive index, and
$v_d$ is an Abbe constant.

The advantages of, and the requirements for, such arrangement are now explained.

As described above, there is a mounting demand for having a wide-angle arrangement at the zoom wide-angle end; however, that wide-angle arrangement renders the correction of chromatic aberration of magnification difficult. What is particularly difficult to correct is the so-called secondary spectrum that, upon achromatization at two certain wavelengths, remains at other wavelengths. It is well known that much difficulty is encountered in the correction of this residual chromatic aberration by use of a combination of vitreous materials having ordinary partial dispersion ratios, and that correction in particular gets more difficult by reason of an increase in the power of each lens group incidental with size reductions and the wide-angle arrangement, as described above. The vitreous material that satisfies conditions (3) and (4) simultaneously has low dispersion and anomalous dispersion; if the negative lens in the second lens group, and the positive lens in the fourth lens group is made of such a vitreous material, it is then possible to correct the secondary spectrum of the chromatic aberration of magnification produced at the wide-angle end while minimizing chromatic aberrations occurring at each lens group.

According to yet another aspect of the invention, there is a zoom lens provided, which comprises, in order from its object side, a first lens group having positive refracting power, a second lens group having negative refracting power, a third lens group having positive refracting power and a fourth lens group having positive refracting power, wherein zooming is implemented by changing the space between the respective lens groups, characterized in that:

the second lens group comprises a front unit having negative refracting power and a rear unit having negative refracting power, and focusing on a nearby subject is implemented by allowing the second lens group to move in an optical axis direction with a change in the space between said front unit and said rear unit.

The advantages of, and the requirements for, such arrangement are now explained.

As described above, reductions in the closest object distance are desired for the specifications of recently developed zoom lenses. Generally for faster focusing, more reduced lens diameters, further reductions in the closest object distance, etc., the so-called inner focusing mode involving the movement of lens groups within a lens system is often used. A zoom lens comprising a first lens group having positive refracting power, a second lens group having negative refracting power, a third lens group having positive refracting power and a fourth lens group having positive refracting power as contemplated herein relies on a focusing mode involving the movement of the second lens group in the optical axis direction. In this case, however, not only is there a large fluctuation of astigmatism, etc. in association with focusing on a nearby distance, which may otherwise render near distance performance worse, but also there is a certain limit on the reductions in the closest object distance.

In the invention, the second lens group is built up of a front unit having negative refracting power and a rear unit having negative refracting power, and focusing is implemented by moving the whole second lens group in the optical axis direction while there is a change in the space between the front unit and the rear unit, thereby minimizing fluctuations of astigmatism in association with focusing on a nearby subject.

Such arrangement as contemplated herein is more effective for a zoom lens having an angle of view of 80° or greater and a zoom ratio of 4 or higher.

If there is a negative lens having at least one aspheric surface on the object side nearest to the second lens group and there is a negative lens having at least one aspheric surface nearest to the image plane side, it is desirous because of further reductions in fluctuations of distortion and astigmatism at the wide-angle end, and fluctuations of astigmatism, etc. in association with focusing on a nearby subject.

Preferably, the first lens group comprises, in order from its object side, a cemented positive lens of negative and positive lens elements, and a positive meniscus lens convex on the object side.

It is then easy to correct chromatic aberrations, off-axis aberrations on the wide-angle side, and spherical aberrations on the telephoto side while making sure the first lens group has positive refracting power.

Preferably, the second lens group comprises a double-convex positive lens, a plurality of negative lenses located more on the object side than that double-convex positive lens, and a negative lens located more on the image side than that double-convex positive lens.

It is then easy to correct chromatic aberrations, off-axis aberrations on the wide-angle side, and spherical aberrations while making sure the second lens group has negative refracting power.

More preferably, that double-convex positive lens should be cemented to the object-side negative lens, and that negative lens should be a double-concave negative lens.

This works more favorably for the correction of chromatic aberrations, and facilitates holding back aberration fluctuations due to the decentration of the double-concave negative lens and double-convex positive lens in the second lens group.

In view of the correction of aberrations, that double-concave negative lens in particular satisfies the aforesaid conditions (3) and (4).

Preferably, the third lens group comprises a positive lens and a negative lens.

It is then easy to hold back the occurrence of chromatic aberrations at the third lens group.

Preferably, the fourth lens group comprises a double-convex positive lens, an object-side positive lens located on the object side of that double-convex positive lens, and a cemented positive lens located on the image side of that double-convex positive lens.

It is then easy to make strong the refracting power of the fourth lens group, and that works for holding back the occurrence of spherical aberrations, coma and chromatic aberrations.

More preferably, that cemented positive lens should comprise, in order from its object side, a negative lens and a double-convex positive lens.

This works favorably for reducing chromatic aberrations at the fourth lens group and aberration fluctuations due to decentration.

More preferably for the correction of aberrations, the double-convex position lens in the cemented positive lens should satisfy the aforesaid conditions (3) and (4).

More preferably for the correction of aberrations, the object-side positive lens in the fourth lens group should be configured in the form of a double-convex positive lens that satisfies the aforesaid conditions (3) and (4).

Of course, satisfying some or all of the aforesaid arrangements of the invention simultaneously achieves a zoom lens that works more favorably for ever higher performance.

More preferably, conditions (1) and (2) should be narrowed down:
the lower limit to condition (1) should be set at 0.11;
the upper limit to condition (1) should be set at 0.135;
the lower limit to condition (2) should be set at 0.13; and
the upper limit to condition (2) should be set at 0.5.

More preferably, conditions (3) and (4) should be narrowed down:

$$1.7 > n_d > 1.4 \tag{3}'$$

$$120 > v_d > 80 \tag{4}'$$

Exceeding the upper limits to the respective conditions is preferable for the correction of aberrations; however, the materials are difficult to fabricate, and less available as well.

According to the invention, it is possible to obtain a zoom lens suitable for interchangeable lenses, etc. for single-lens reflex cameras that have high performances: longer back focuses, high zoom rations and large aperture ratios, and reductions in the closest object distance.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is illustrative, as in FIG. 1, of Example 2 of the zoom lens according to the invention.

FIG. 3 is illustrative, as in FIG. 1, of Example 3 of the zoom lens according to the invention.

FIG. 4 is illustrative, as in FIG. 1, of Example 4 of the zoom lens according to the invention.

FIG. 10 is an aberration diagram for Example 3 upon focusing on a subject distance of 25 cm.

DESCRIPTION OF THE PREFERRED EMBODIMENTS

Examples 1, 2, 3 and 4 of the inventive zoom lens are given below. FIGS. 1, 2, 3 and 4 are illustrative in lens arrangement section of Examples 1, 2, 3 and 4 at their wide-angle ends (a), in their intermediate states (b) and at their telephoto ends (c), respectively, upon focusing on an object point at infinity. In these figures, G1 stands for the first lens group, G2 the second lens group, S an aperture stop, G3 the third lens group, G4 the fourth lens group, C a plane-parallel plate for the cover glass, etc. of an electronic imaging device, and I an image plane.

EXAMPLE 1

Figures 1A, 1B, 1C:
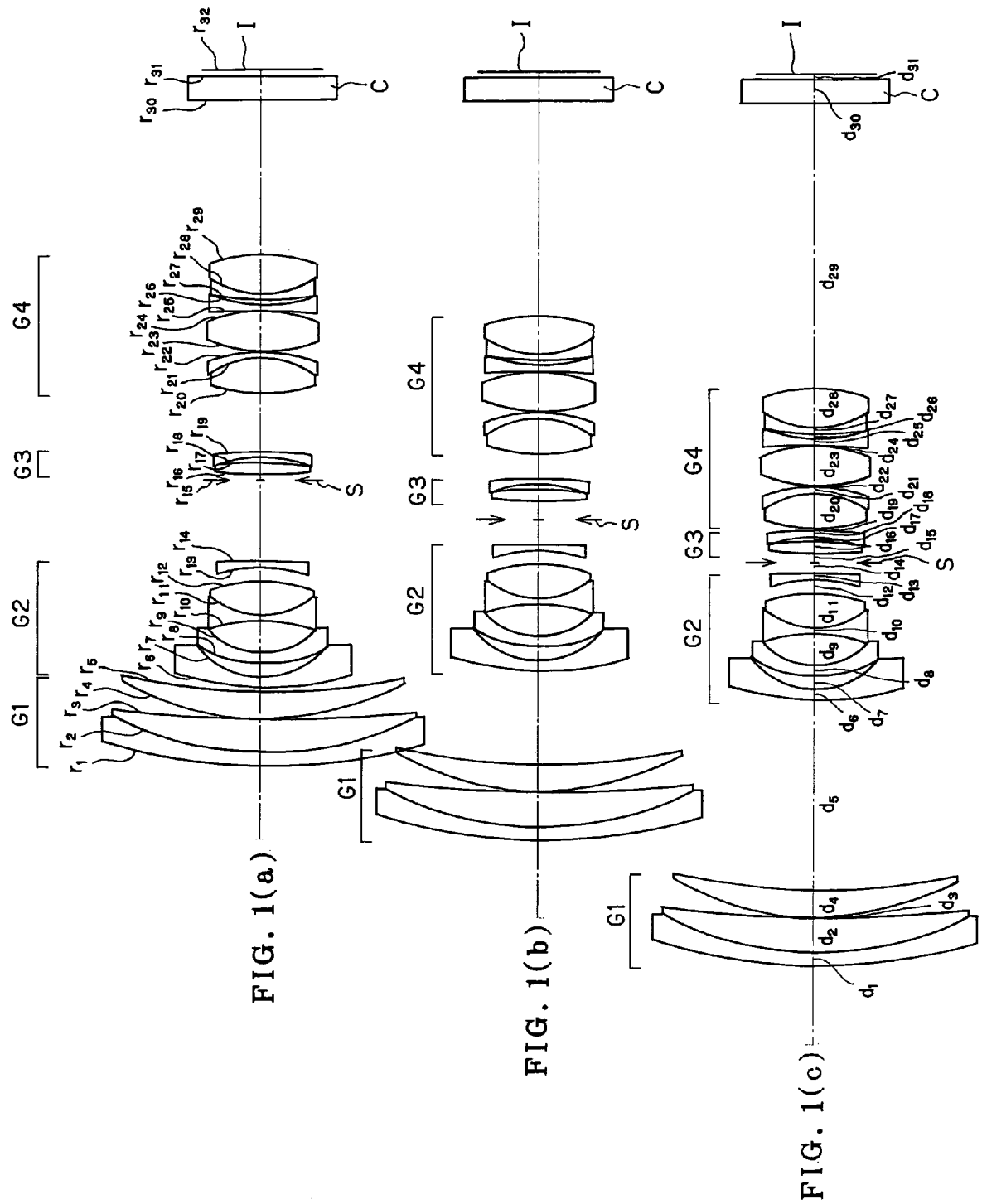
FIG. 1 is illustrative in lens arrangement section of Example 1 of the zoom lens according to the invention at the wide-angle end (a), in an intermediate state (b), and at the telephoto end (c), respectively.

As shown in FIG. 1, this example is directed to a zoom lens made up of, in order from its object side, the first lens group G1 having positive refracting power, the second lens group G2 having negative refracting power, the aperture stop S, the third lens group G3 having positive refracting power, and the fourth lens group G4 having positive refracting power. Upon zooming from the wide-angle end to the telephoto end of the zoom lens, the first lens group G1 moves toward the object side, and the second lens group G2 moves in a convex locus toward the image plane side and is positioned a bit more on the object side at the telephoto end than at the wide-angle end. The aperture stop S moves toward the object side while the space between it and the second lens group G2 becomes narrow, the third lens group G3 moves toward the object side while the space between it and the aperture stop S grows first wide and then narrow and the space between it and the second lens group G2 becomes narrow, and the fourth lens group G4 moves toward the object side while the space between it and the third lens group G3 gets narrow.

In order from the object side, the first lens group G1 is made up of a cemented lens of a negative meniscus lens convex on its object side and a positive meniscus lens convex on its object side, and a positive meniscus lens convex on its object side, and the second lens group G2 is made up of two negative meniscus lenses, each convex on its object side, a cemented lens of a double-concave negative lens and a double-convex positive lens, and a negative meniscus lens convex on its image plane side, wherein the first mentioned negative meniscus lens and the cemented lens constitute together the front unit of the second lens group G2 while the one negative meniscus lens located nearest to the image plane side forms the rear unit of the second lens group G2. The third lens group G3 is made up of a double-convex positive lens and a negative meniscus lens convex on its image plane side, and the fourth lens group G4 is made up of a cemented lens of a double-convex positive lens and a negative meniscus lens convex on its image plane side, a double-convex positive lens, a double-concave negative lens, and a cemented lens of a negative meniscus lens convex on its object side and a double-convex positive lens.

Six aspheric surfaces are used: two at both surfaces of the second negative meniscus in the second lens group G2 as counted from its object side, two at both surfaces of the negative meniscus lens located in the second lens group G2 and nearest to its image plane side, and two at both surface of the single double-convex positive lens in the fourth lens group G4.

Focusing on a nearby subject (object point) is implemented by moving the whole second lens group G2 toward the object side while the space between the front unit and the rear unit of the second lens group G2 gets narrow.

EXAMPLE 2

As shown in FIG. 2, this example is directed to a zoom lens made up of, in order from its object side, the first lens group G1 having positive refracting power, the second lens group G2 having negative refracting power, the aperture stop S, the third lens group G3 having positive refracting power, and the fourth lens group G4 having positive refracting power. Upon zooming from the wide-angle end to the telephoto end of the zoom lens, the first lens group G1 moves toward the object side, and the second lens group G2 moves in a convex locus toward the image plane side and is positioned a bit more on the object side at the telephoto end than at the wide-angle end. The aperture stop S moves toward the object side while the space between it and the second lens group G2 becomes narrow, the third lens group G3 moves toward the object side while the space between it and the aperture stop S grows first wide and then narrow and the space between it and the second lens group G2 gets narrow, and the fourth lens group G4 moves toward the object side while the space between it and the third lens group G3 gets narrow.

In order from the object side, the first lens group G1 is made up of a cemented lens of a negative meniscus lens convex on its object side and a positive meniscus lens convex on its object side, and a positive meniscus lens convex on its object side, and the second lens group G2 is made up of two negative meniscus lenses, each convex on its object side, a cemented lens of a double-concave negative lens and a double-convex positive lens, and a negative meniscus lens convex on its image plane side, wherein the first mentioned negative meniscus lens and the cemented lens constitute together the front unit of the second lens group G2 while the one negative meniscus lens located nearest to the image plane side forms the rear unit of the second lens group G2. The third lens group G3 is made up of a double-convex positive lens and a cemented lens of a double-convex positive lens and a double-concave negative lens, and the fourth lens group G4 is made up of a cemented lens of a double-convex positive lens and a negative meniscus lens convex on its image plane side, a double-convex positive lens, and a cemented lens of a double-concave negative lens and a double-convex positive lens.

Five aspheric surfaces are used: on at the object-side surface of the negative meniscus lens located in, and nearest to the object side of, the second lens group G2, two at both surfaces of the negative meniscus lens located in, and nearest to the image plane side of, the second lens group G2, and two at both surfaces of the single double-convex positive lens in the fourth lens group G4.

Focusing on a nearby subject (object point) is implemented by moving the whole second lens group G2 toward the object side while the space between the front unit and the rear unit of the second lens group G2 gets narrow.

EXAMPLE 3

As shown in FIG. 3, this example is directed to a zoom lens made up of, in order from its object side, the first lens group G1 having positive refracting power, the second lens group G2 having negative refracting power, the aperture stop S, the third lens group G3 having positive refracting power, and the fourth lens group G4 having positive refracting power. Upon zooming from the wide-angle end to the telephoto end of the zoom lens, the first lens group G1 moves toward the object side, and the second lens group G2 moves in a convex locus toward the image plane side and is positioned a bit more on the object side at the telephoto end than at the wide-angle end. The aperture stop S moves toward the object side while the space between it and the second lens group G2 becomes narrow, the third lens group G3 moves toward the object side while the space between it and the aperture stop S grows first wide and then narrow and the space between it and the second lens group G2 gets narrow, and the fourth lens group G4 moves toward the object side while the space between it and the third lens group G3 gets narrow.

In order from the object side, the first lens group G1 is made up of a cemented lens of a negative meniscus lens convex on its object side and a positive meniscus lens convex on its object side, and a positive meniscus lens convex on its object side, and the second lens group G2 is made up of a cemented lens of a thin negative meniscus lens convex on its object side and a negative meniscus lens convex on its object side, a negative meniscus lens convex on its image plane side, a double-convex positive lens, and a negative meniscus lens convex on its image plane side, wherein the cemented lens, the first mentioned negative meniscus lens and the double-convex positive lens constitute together the front unit of the second lens group G2 and the one negative meniscus lens nearest to the image plane side forms the rear unit of the second lens group G2. The third lens group G3 is made up of a double-convex positive lens, and a cemented lens of a double-convex positive lens and a double-concave negative lens, and the fourth lens group G4 is made up of a cemented lens of a double-convex positive lens and a negative meniscus lens convex on its image plane side, a double-convex positive lens, and a cemented lens of a double-concave negative lens and a double-convex positive lens.

Five aspheric surfaces are used: one at the surface of the cemented lens in the second lens group G2, two at both surfaces of the negative meniscus lens located in, and nearest to the image plane side of, the second lens group G2, and two both surfaces of the single double-convex positive lens in the fourth lens group G4.

Focusing on a nearby subject (object point) is implemented by moving the whole second lens group G2 toward the object side while the space between the front unit and the rear unit of the second lens group G2 gets narrow.

EXAMPLE 4

As shown in FIG. 4, this example is directed to a zoom lens made up of, in order from its object side, the first lens group G1 having positive refracting power, the second lens group G2 having negative refracting power, the aperture stop S, the third lens group G3 having positive refracting power, and the fourth lens group G4 having positive refracting power. Upon zooming from the wide-angle end to the telephoto end of the zoom lens, the first lens group G1 moves toward the object side, and the second lens group G2 moves in a convex locus toward the image plane side and is positioned a bit more on the object side at the telephoto end than at the wide-angle end. The aperture stop S moves toward the object side while the space between it and the second lens group G2 becomes narrow, the third lens group G3 moves together with the aperture stop S toward the object side, and the fourth lens group G4 moves toward the object side while the space between it and the third lens group G3 gets narrow.

In order from the object side, the first lens group G1 is made up of a cemented lens of a negative meniscus lens convex on its object side and a plano-convex positive lens convex on its object side, and a positive meniscus lens convex on its object side, and the second lens group G2 is made up of a thin negative meniscus lens convex on its object side and a negative meniscus lens convex on its object side, a cemented lens of a double-concave negative lens and a double-convex positive lens, and a negative meniscus lens convex on its image plane side, wherein the two cemented lenses constitute together the front unit of the second lens group G2 having negative refracting power and the one negative meniscus lens nearest to the image plane side forms the rear unit of the second lens group G2. The third lens group G3 is made up of a double-convex positive lens and a cemented lens of a double-convex positive lens and a double-concave negative lens, and the fourth lens group G4 is made up of two double-convex positive lenses, and a cemented lens of a double-concave negative lens and a double-convex positive lens.

Five aspheric surfaces are used: one at the surface nearest to the object side of the object-side cemented lens in the second lens group G2, two at both surfaces of the negative meniscus lens located in, and nearest to the image plane side of, the second lens group G2, and two both surfaces of the single double-convex positive lens in the fourth lens group G4.

Focusing on a nearby subject (object point) is implemented by moving the whole second lens group G2 toward the object side while the space between the front unit and the rear unit of the second lens group G2 gets narrow.

Set out below are the numerical data on each example. The symbols used hereinafter but not hereinbefore are indicative of:

f: the focal length of the whole system,
$F_{NO}$: an F-number,
WE: the wide-angle end,
ST: an intermediate state,
TE: the telephoto end,
$r_1, r_2, \ldots$ : the radius of curvature of each lens surface,
$d_1, d_2, \ldots$ : the space between the respective lens surfaces,
$n_{d1}, n_{d2}, \ldots$ : the d-line refractive index of each lens,
$v_{d1}, v_{d2}, \ldots$ : the Abbe constant of each lens, and
OD is a subject distance as measured from the image plane. Suppose here that x is an optical axis with the direction of travel of light taken as positive and y is a direction orthogonal to the optical axis. Then, aspheric configuration is given by $$x = (y^2/r)/[1+\{1-(K+1)(y/r)^2\}^{1/2}] + A_4 y^4 + A_6 y^6 + A_8 y^8 + A_{10} y^{10} + A_{12} y^{12}$$

where r is a paraxial radius of curvature, and A4, A6, A8, A10 and A12 are the $4^{th}$, $6^{th}$, $8^{th}$, $10^{th}$, and $12^{th}$-order aspheric coefficients, respectively.

EXAMPLE 1

| | | | |
|---|---|---|---|
| $r_1 = 109.4949$ | $d_1 = 2.5500$ | $n_{d1} = 1.84666$ | $v_{d1} = 23.78$ |
| $r_2 = 65.6064$ | $d_2 = 6.5166$ | $n_{d2} = 1.56384$ | $v_{d2} = 60.67$ |
| $r_3 = 250.3611$ | $d_3 = 0.2000$ | | |
| $r_4 = 56.3041$ | $d_4 = 5.2365$ | $n_{d3} = 1.77250$ | $v_{d3} = 49.60$ |
| $r_5 = 129.4446$ | $d_5 = $ (Variable) | | |
| $r_6 = 56.6646$ | $d_6 = 2.0000$ | $n_{d4} = 1.88300$ | $v_{d4} = 40.76$ |
| $r_7 = 15.7727$ | $d_7 = 2.9353$ | | |
| $r_8 = 59.6791$ (Aspheric) | $d_8 = 1.9684$ | $n_{d5} = 1.80610$ | $v_{d5} = 40.88$ |
| $r_9 = 20.8286$ (Aspheric) | $d_9 = 6.1861$ | | |
| $r_{10} = -31.0694$ | $d_{10} = 1.1413$ | $n_{d6} = 1.43875$ | $v_{d6} = 94.93$ |
| $r_{11} = 15.7046$ | $d_{11} = 6.7088$ | $n_{d7} = 1.61293$ | $v_{d7} = 37.00$ |
| $r_{12} = -29.7268$ | $d_{12} = $ (Variable) | | |

-continued

| | | | |
|---|---|---|---|
| $r_{13} = -24.5029$ (Aspheric) | $d_{13} = 1.2783$ | $n_{d8} = 1.80610$ | $v_{d8} = 40.88$ |
| $r_{14} = -92.4430$ (Aspheric) | $d_{14} = $ (Variable) | | |
| $r_{15} = \infty$ (Stop) | $d_{15} = $ (Variable) | | |
| $r_{16} = 67.0118$ | $d_{16} = 2.4442$ | $n_{d9} = 1.76182$ | $v_{d9} = 26.52$ |
| $r_{17} = -69.5017$ | $d_{17} = 0.9379$ | | |
| $r_{18} = -27.8030$ | $d_{18} = 1.1994$ | $n_{d10} = 1.75500$ | $v_{d10} = 52.32$ |
| $r_{19} = -81.0550$ | $d_{19} = $ (Variable) | | |
| $r_{20} = 35.1459$ | $d_{20} = 6.7687$ | $n_{d11} = 1.43875$ | $v_{d11} = 94.93$ |
| $r_{21} = -17.3775$ | $d_{21} = 1.2000$ | $n_{d12} = 1.88300$ | $v_{d12} = 40.76$ |
| $r_{22} = -30.3574$ | $d_{22} = 0.2000$ | | |
| $r_{23} = 26.3652$ (Aspheric) | $d_{23} = 7.7834$ | $n_{d13} = 1.49700$ | $v_{d13} = 81.54$ |
| $r_{24} = -24.7855$ (Aspheric) | $d_{24} = 0.1500$ | | |
| $r_{25} = -96.4756$ | $d_{25} = 1.2057$ | $n_{d14} = 1.69680$ | $v_{d14} = 55.53$ |
| $r_{26} = 31.6869$ | $d_{26} = 0.8737$ | | |
| $r_{27} = 52.5247$ | $d_{27} = 1.3000$ | $n_{d15} = 1.88300$ | $v_{d15} = 40.76$ |
| $r_{28} = 19.1738$ | $d_{28} = 7.3100$ | $n_{d16} = 1.49700$ | $v_{d16} = 81.54$ |
| $r_{29} = -32.1161$ | $d_{29} = $ (Variable) | | |
| $r_{30} = \infty$ | $d_{30} = 4.6000$ | $n_{d17} = 1.51633$ | $v_{d17} = 64.14$ |
| $r_{31} = \infty$ | $d_{31} = 1.0603$ | | |
| $r_{32} = \infty$ (Imaging plane) | | | |

Aspherical Coefficients

8th surface $K = 0$
$A_4 = 1.5703 \times 10^{-4}$
$A_6 = -6.2535 \times 10^{-7}$
$A_8 = 1.8023 \times 10^{-9}$
$A_{10} = -4.7976 \times 10^{-12}$ 9th surface $K = 0$
$A_4 = 1.8640 \times 10^{-4}$
$A_6 = -3.0654 \times 10^{-7}$
$A_8 = 1.6790 \times 10^{-9}$
$A_{10} = -1.1240 \times 10^{-11}$ 13th surface $K = 0$
$A_4 = 6.4830 \times 10^{-5}$
$A_6 = -1.4322 \times 10^{-7}$
$A_8 = 4.0045 \times 10^{-11}$
$A_{10} = 0.0000$ 14th surface $K = 0$
$A_4 = 5.2909 \times 10^{-5}$
$A_6 = -1.6207 \times 10^{-7}$
$A_8 = 0.0000$
$A_{10} = 0.0000$ 23th surface $K = 0$
$A_4 = -1.5009 \times 10^{-5}$
$A_6 = 3.8481 \times 10^{-8}$
$A_8 = -1.6118 \times 10^{-10}$
$A_{10} = 0.0000$ 24th surface $K = 0$
$A_4 = 2.6325 \times 10^{-5}$
$A_6 = -7.9830 \times 10^{-9}$
$A_8 = -7.1375 \times 10^{-11}$
$A_{10} = 0.0000$

Zooming Data ($\infty$)

| | WE | ST | TE |
|---|---|---|---|
| f (mm) | 12.31 | 24.42 | 49.14 |
| $F_{NO}$ | 2.88 | 3.20 | 3.57 |
| $d_5$ | 0.80000 | 18.51118 | 37.33684 |
| $d_{12}$ | 2.69354 | 2.69354 | 2.69354 |

-continued

| | | | |
|---|---|---|---|
| $d_{14}$ | 16.00294 | 5.07006 | 2.15164 |
| $d_{15}$ | 1.37426 | 3.59390 | 1.70000 |
| $d_{19}$ | 10.99914 | 4.54263 | 0.60000 |
| $d_{29}$ | 29.59504 | 41.08752 | 55.16241 |
| | (OD = 250 mm) | | |
| $d_5$ | 0.58742 | 17.63032 | 35.17989 |
| $d_{12}$ | 0.84541 | 0.84541 | 0.84541 |
| $d_{14}$ | 18.06366 | 7.79904 | 6.15671 |
| $d_{15}$ | 1.37426 | 3.59390 | 1.70000 |
| $d_{19}$ | 10.99914 | 4.54263 | 0.60000 |
| $d_{29}$ | 29.59504 | 41.08752 | 55.16241 |

EXAMPLE 2

| | | | |
|---|---|---|---|
| $r_1 = 133.9297$ | $d_1 = 2.5500$ | $n_{d1} = 1.84666$ | $v_{d1} = 23.78$ |
| $r_2 = 70.8155$ | $d_2 = 5.5842$ | $n_{d2} = 1.56384$ | $v_{d2} = 60.67$ |
| $r_3 = 628.1229$ | $d_3 = 0.2000$ | | |
| $r_4 = 55.7629$ | $d_4 = 4.3250$ | $n_{d3} = 1.75500$ | $v_{d3} = 52.32$ |
| $r_5 = 132.6592$ | $d_5 = $ (Variable) | | |
| $r_6 = 83.7872$ (Aspheric) | $d_6 = 1.8000$ | $n_{d4} = 1.88300$ | $v_{d4} = 40.76$ |
| $r_7 = 12.8779$ | $d_7 = 5.8688$ | | |
| $r_8 = 91.7309$ | $d_8 = 1.5925$ | $n_{d5} = 1.80610$ | $v_{d5} = 40.88$ |
| $r_9 = 40.0967$ | $d_9 = 3.8406$ | | |
| $r_{10} = -23.9023$ | $d_{10} = 1.1413$ | $n_{d6} = 1.43875$ | $v_{d6} = 94.93$ |
| $r_{11} = 29.7208$ | $d_{11} = 4.6330$ | $n_{d7} = 1.74000$ | $v_{d7} = 28.30$ |
| $r_{12} = -35.1879$ | $d_{12} = $ (Variable) | | |
| $r_{13} = -22.3039$ (Aspheric) | $d_{13} = 1.3000$ | $n_{d8} = 1.80610$ | $v_{d8} = 40.88$ |
| $r_{14} = -40.3842$ (Aspheric) | $d_{14} = $ (Variable) | | |
| $r_{15} = \infty$ (Stop) | $d_{15} = $ (Variable) | | |
| $r_{16} = 63.8808$ | $d_{16} = 2.2014$ | $n_{d9} = 1.74320$ | $v_{d9} = 49.34$ |
| $r_{17} = -114.0569$ | $d_{17} = 0.0000$ | | |
| $r_{18} = 25.8855$ | $d_{18} = 4.2726$ | $n_{d10} = 1.51742$ | $v_{d10} = 52.43$ |
| $r_{19} = -43.9674$ | $d_{19} = 1.1922$ | $n_{d11} = 1.77250$ | $v_{d11} = 49.60$ |
| $r_{20} = 32.3633$ | $d_{20} = $ (Variable) | | |
| $r_{21} = 26.1059$ | $d_{21} = 5.9106$ | $n_{d12} = 1.43875$ | $v_{d12} = 94.93$ |
| $r_{22} = -20.6230$ | $d_{22} = 1.1678$ | $n_{d13} = 1.81600$ | $v_{d13} = 46.62$ |
| $r_{23} = -37.8449$ | $d_{23} = 0.2000$ | | |
| $r_{24} = 77.1275$ (Aspheric) | $d_{24} = 9.1919$ | $n_{d14} = 1.43875$ | $v_{d14} = 94.93$ |
| $r_{25} = -27.8225$ (Aspheric) | $d_{25} = 0.1500$ | | |
| $r_{26} = -171.1239$ | $d_{26} = 1.2667$ | $n_{d15} = 1.88300$ | $v_{d15} = 40.76$ |
| $r_{27} = 21.2550$ | $d_{27} = 5.9748$ | $n_{d16} = 1.51823$ | $v_{d16} = 58.90$ |
| $r_{28} = -39.0618$ | $d_{28} = $ (Variable) | | |
| $r_{29} = \infty$ | $d_{29} = 4.6000$ | $n_{d17} = 1.51633$ | $v_{d17} = 64.14$ |
| $r_{30} = \infty$ | $d_{30} = 1.0600$ | | |
| $r_{31} = \infty$ (Imaging plane) | | | |

Aspherical Coefficients

6th surface $K = 1.7635$
$A_4 = 1.3806 \times 10^{-5}$
$A_6 = -2.6968 \times 10^{-8}$
$A_8 = -8.3717 \times 10^{-12}$
$A_{10} = 1.9486 \times 10^{-13}$
$A_{12} = -3.5163 \times 10^{-16}$

13th surface $K = 0$
$A_4 = 1.1284 \times 10^{-5}$
$A_6 = -2.7446 \times 10^{-8}$
$A_8 = 2.1064 \times 10^{-9}$
$A_{10} = -1.4063 \times 10^{-11}$

14th surface $K = 0$
$A_4 = 7.3332 \times 10^{-6}$
$A_6 = -1.3581 \times 10^{-8}$
$A_8 = 9.8131 \times 10^{-10}$
$A_{10} = -7.0268 \times 10^{-12}$

24th surface $K = 0$
$A_4 = -1.7023 \times 10^{-5}$
$A_6 = 4.2058 \times 10^{-9}$
$A_8 = 3.0899 \times 10^{-10}$
$A_{10} = 0.0000$

25th surface $K = 0$
$A_4 = 1.4658 \times 10^{-5}$
$A_6 = -1.2664 \times 10^{-8}$
$A_8 = 3.4364 \times 10^{-10}$
$A_{10} = 0.0000$

Zooming Data ($\infty$)

| | WE | ST | TE |
|---|---|---|---|
| f (mm) | 12.36 | 26.05 | 58.82 |
| $F_{NO}$ | 2.88 | 3.50 | 4.08 |
| $d_5$ | 0.91498 | 19.02982 | 40.39278 |
| $d_{12}$ | 4.09389 | 4.09389 | 4.09389 |
| $d_{14}$ | 21.63568 | 4.45715 | 2.15164 |
| $d_{15}$ | 3.31209 | 6.81666 | 1.70000 |
| $d_{20}$ | 10.35886 | 4.00218 | 0.60000 |
| $d_{28}$ | 29.23134 | 43.21124 | 61.28523 |
| | (OD = 250 mm) | | |
| $d_5$ | 0.80288 | 18.18846 | 37.81587 |
| $d_{12}$ | 1.38885 | 1.38885 | 1.38885 |
| $d_{14}$ | 24.45282 | 8.00354 | 7.43359 |
| $d_{15}$ | 3.31209 | 6.81666 | 1.70000 |
| $d_{20}$ | 10.35886 | 4.00218 | 0.60000 |
| $d_{28}$ | 29.23134 | 43.21124 | 61.28523 |

EXAMPLE 3

| | | | |
|---|---|---|---|
| $r_1 = 149.4865$ | $d_1 = 2.5500$ | $n_{d1} = 1.84666$ | $v_{d1} = 23.78$ |
| $r_2 = 72.9114$ | $d_2 = 6.3970$ | $n_{d2} = 1.56384$ | $v_{d2} = 60.67$ |
| $r_3 = 6612.0179$ | $d_3 = 0.2000$ | | |
| $r_4 = 50.4880$ | $d_4 = 4.6358$ | $n_{d3} = 1.77250$ | $v_{d3} = 49.60$ |
| $r_5 = 101.1472$ | $d_5 = $ (Variable) | | |
| $r_6 = 231.2367$ (Aspheric) | $d_6 = 0.1500$ | $n_{d4} = 1.52288$ | $v_{d4} = 52.50$ |
| $r_7 = 62.9706$ | $d_7 = 1.8000$ | $n_{d5} = 1.88300$ | $v_{d5} = 40.76$ |
| $r_8 = 12.1142$ | $d_8 = 9.7070$ | | |
| $r_9 = -20.0260$ | $d_9 = 1.5836$ | $n_{d6} = 1.71300$ | $v_{d6} = 53.87$ |
| $r_{10} = -82.8026$ | $d_{10} = 0.1132$ | | |
| $r_{11} = 94.2202$ | $d_{11} = 3.6706$ | $n_{d7} = 1.84666$ | $v_{d7} = 23.78$ |
| $r_{12} = -32.9015$ | $d_{12} = $ (Variable) | | |
| $r_{13} = -26.1797$ (Aspheric) | $d_{13} = 1.2879$ | $n_{d8} = 1.69680$ | $v_{d8} = 55.53$ |
| $r_{14} = -62.2624$ (Aspheric) | $d_{14} = $ (Variable) | | |
| $r_{15} = \infty$ (Stop) | $d_{15} = $ (Variable) | | |
| $r_{16} = 72.0562$ | $d_{16} = 1.9100$ | $n_{d9} = 1.67790$ | $v_{d9} = 55.34$ |
| $r_{17} = -153.1599$ | $d_{17} = 0.1000$ | | |
| $r_{18} = 27.3638$ | $d_{18} = 4.6088$ | $n_{d10} = 1.51823$ | $v_{d10} = 58.90$ |
| $r_{19} = -25.5166$ | $d_{19} = 1.1965$ | $n_{d11} = 1.69680$ | $v_{d11} = 55.53$ |
| $r_{20} = 38.1737$ | $d_{20} = $ (Variable) | | |
| $r_{21} = 27.4467$ | $d_{21} = 4.9545$ | $n_{d12} = 1.43875$ | $v_{d12} = 94.93$ |
| $r_{22} = -31.9955$ | $d_{22} = 1.1402$ | $n_{d13} = 1.69680$ | $v_{d13} = 55.53$ |
| $r_{23} = -56.9889$ | $d_{23} = 0.2000$ | | |
| $r_{24} = 62.6056$ (Aspheric) | $d_{24} = 8.3345$ | $n_{d14} = 1.49700$ | $v_{d14} = 81.54$ |
| $r_{25} = -40.5654$ (Aspheric) | $d_{25} = 0.1500$ | | |
| $r_{26} = -172.9586$ | $d_{26} = 1.2621$ | $n_{d15} = 1.88300$ | $v_{d15} = 40.76$ |
| $r_{27} = 21.3503$ | $d_{27} = 6.4097$ | $n_{d16} = 1.49700$ | $v_{d16} = 81.54$ |
| $r_{28} = -30.7497$ | $d_{28} = $ (Variable) | | |

-continued

| | | | |
|---|---|---|---|
| $r_{29} = \infty$ | $d_{29} = 4.6000$ | $n_{d17} = 1.51633$ | $v_{d17} = 64.14$ |
| $r_{30} = \infty$ | $d_{30} = 1.0600$ | | |
| $r_{31} = \infty$ (Imaging plane) | | | |

Aspherical Coefficients

6th surface $K = 159.4608$
$A_4 = 4.3367 \times 10^{-5}$
$A_6 = -1.4020 \times 10^{-7}$
$A_8 = 3.7624 \times 10^{-10}$
$A_{10} = -6.6989 \times 10^{-13}$
$A_{12} = 3.8476 \times 10^{-16}$ 13th surface $K = 0$
$A_4 = -2.1382 \times 10^{-5}$
$A_6 = 3.8665 \times 10^{-7}$
$A_8 = -2.2226 \times 10^{-10}$
$A_{10} = -1.6238 \times 10^{-11}$ 14th surface $K = 0$
$A_4 = -1.8267 \times 10^{-5}$
$A_6 = 2.5498 \times 10^{-7}$
$A_8 = 8.8866 \times 10^{-10}$
$A_{10} = -2.1610 \times 10^{-11}$ 24th surface $K = 0$
$A_4 = -1.1052 \times 10^{-5}$
$A_6 = 2.2345 \times 10^{-9}$
$A_8 = 2.4337 \times 10^{-10}$
$A_{10} = 0.0000$ 25th surface $K = 0$
$A_4 = 1.6900 \times 10^{-5}$
$A_6 = -1.0380 \times 10^{-8}$
$A_8 = 2.8435 \times 10^{-10}$
$A_{10} = 0.0000$ Zooming Data ($\infty$)

| | WE | ST | TE |
|---|---|---|---|
| f (mm) | 12.37 | 26.82 | 58.74 |
| FNO | 2.88 | 3.50 | 4.08 |
| $d_5$ | 0.74536 | 19.84896 | 40.78501 |
| $d_{12}$ | 4.08951 | 4.08951 | 4.08951 |
| $d_{14}$ | 21.74410 | 10.75495 | 2.15164 |
| $d_{15}$ | 5.62433 | 1.41631 | 1.70000 |
| $d_{20}$ | 6.74840 | 2.16306 | 0.60000 |
| $d_{28}$ | 29.49174 | 42.81400 | 58.04971 |
| (OD = 250 mm) | | | |
| $d_5$ | 0.75192 | 18.94355 | 37.83580 |
| $d_{12}$ | 0.92556 | 0.92556 | 0.92556 |
| $d_{14}$ | 24.90149 | 14.82432 | 8.26481 |
| $d_{15}$ | 5.62433 | 1.41631 | 1.70000 |
| $d_{20}$ | 6.74840 | 2.16306 | 0.60000 |
| $d_{28}$ | 29.49174 | 42.81400 | 58.04971 |

EXAMPLE 4

| | | | |
|---|---|---|---|
| $r_1 = 144.2266$ | $d_1 = 2.5500$ | $n_{d1} = 1.84666$ | $v_{d1} = 23.78$ |
| $r_2 = 80.6172$ | $d_2 = 6.2616$ | $n_{d2} = 1.56384$ | $v_{d2} = 60.67$ |
| $r_3 = \infty$ | $d_3 = 0.1000$ | | |
| $r_4 = 52.3050$ | $d_4 = 5.2077$ | $n_{d3} = 1.60311$ | $v_{d3} = 60.64$ |
| $r_5 = 116.6412$ | $d_5 = $ (Variable) | | |
| $r_6 = 113.5593$ (Aspheric) | $d_6 = 0.0880$ | $n_{d4} = 1.51940$ | $v_{d4} = 51.94$ |
| $r_7 = 56.8420$ | $d_7 = 1.5000$ | $n_{d5} = 1.88300$ | $v_{d5} = 40.76$ |
| $r_8 = 12.0420$ | $d_8 = 8.7845$ | | |
| $r_9 = -23.6760$ | $d_9 = 1.2000$ | $n_{d6} = 1.49700$ | $v_{d6} = 81.54$ |
| $r_{10} = 18.7895$ | $d_{10} = 6.6093$ | $n_{d7} = 1.64769$ | $v_{d7} = 33.79$ |
| $r_{11} = -29.8761$ | $d_{11} = $ (Variable) | | |
| $r_{12} = -23.7859$ (Aspheric) | $d_{12} = 1.3635$ | $n_{d8} = 1.69300$ | $v_{d8} = 53.14$ |
| $r_{13} = -60.9085$ (Aspheric) | $d_{13} = $ (Variable) | | |
| $r_{14} = \infty$ (Stop) | $d_{14} = 1.7000$ | | |
| $r_{15} = 50.0908$ | $d_{15} = 2.2951$ | $n_{d9} = 1.58913$ | $v_{d9} = 61.14$ |
| $r_{16} = -140.7841$ | $d_{16} = 0.1500$ | | |
| $r_{17} = 22.8280$ | $d_{17} = 4.6397$ | $n_{d10} = 1.54814$ | $v_{d10} = 45.79$ |
| $r_{18} = -44.0128$ | $d_{18} = 1.0008$ | $n_{d11} = 1.80400$ | $v_{d11} = 46.57$ |
| $r_{19} = 27.3163$ | $d_{19} = $ (Variable) | | |
| $r_{20} = 24.8862$ (Aspheric) | $d_{20} = 6.5073$ | $n_{d12} = 1.49650$ | $v_{d12} = 81.53$ |
| $r_{21} = -50.5293$ (Aspheric) | $d_{21} = 0.1500$ | | |
| $r_{22} = 135.3961$ | $d_{22} = 3.7881$ | $n_{d13} = 1.43875$ | $v_{d13} = 94.93$ |
| $r_{23} = -44.8085$ | $d_{23} = 0.1500$ | | |
| $r_{24} = -180.8473$ | $d_{24} = 1.2340$ | $n_{d14} = 1.88300$ | $v_{d14} = 40.76$ |
| $r_{25} = 19.4304$ | $d_{25} = 11.2743$ | $n_{d15} = 1.49700$ | $v_{d15} = 81.54$ |
| $r_{26} = -27.2992$ | $d_{26} = $ (Variable) | | |
| $r_{27} = \infty$ | $d_{27} = 4.6000$ | $n_{d16} = 1.51633$ | $v_{d16} = 64.14$ |
| $r_{28} = \infty$ | $d_{28} = 1.0586$ | | |
| $r_{29} = \infty$ (Imaging plane) | | | |

Aspherical Coefficients

6th surface $K = 34.8871$
$A_4 = 3.0812 \times 10^{-5}$
$A_6 = -9.6291 \times 10^{-8}$
$A_8 = 1.8012 \times 10^{-10}$
$A_{10} = -2.2992 \times 10^{-13}$
$A_{12} = -1.4937 \times 10^{-16}$ 12th surface $K = 0.0251$
$A_4 = -3.4769 \times 10^{-5}$
$A_6 = 6.1141 \times 10^{-7}$
$A_8 = -3.8025 \times 10^{-9}$
$A_{10} = 1.0400 \times 10^{-11}$ 13th surface $K = -18.7766$
$A_4 = -4.3652 \times 10^{-5}$
$A_6 = 5.5882 \times 10^{-7}$
$A_8 = -3.6933 \times 10^{-9}$
$A_{10} = 9.8343 \times 10^{-12}$ 20th surface $K = 0$
$A_4 = -1.2143 \times 10^{-5}$
$A_6 = -7.3098 \times 10^{-9}$
$A_8 = 2.7747 \times 10^{-10}$
$A_{10} = -3.6706 \times 10^{-12}$ 21st surface $K = 0$
$A_4 = 2.0138 \times 10^{-5}$
$A_6 = -3.6119 \times 10^{-8}$
$A_8 = 3.7265 \times 10^{-10}$
$A_{10} = -3.9715 \times 10^{-12}$ Zooming Data ($\infty$)

| | WE | ST | TE |
|---|---|---|---|
| f (mm) | 12.33 | 26.62 | 58.81 |
| FNO | 2.88 | 3.50 | 4.08 |
| $d_5$ | 0.84223 | 20.86435 | 43.41045 |
| $d_{11}$ | 3.18840 | 3.18840 | 3.18840 |
| $d_{13}$ | 24.08524 | 9.77242 | 2.15164 |
| $d_{19}$ | 8.09555 | 3.06658 | 0.80000 |
| $d_{26}$ | 29.58052 | 43.73719 | 60.80026 |

-continued

|  | (OD = 250 mm) | | |
|---|---|---|---|
| $d_5$ | 0.59917 | 19.79172 | 40.54294 |
| $d_{11}$ | 0.77704 | 0.77704 | 0.77704 |
| $d_{13}$ | 26.74520 | 13.25433 | 7.42963 |
| $d_{19}$ | 8.09555 | 3.06658 | 0.80000 |
| $d_{26}$ | 29.58052 | 43.73719 | 60.80026 |

Figure 5A:
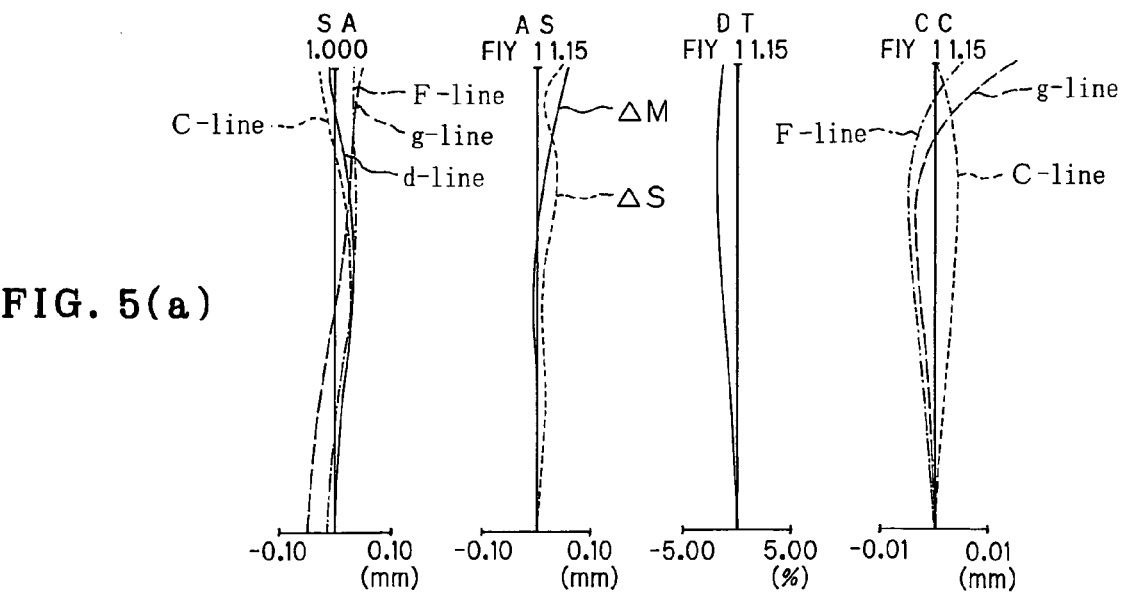
FIG. 5 is an aberration diagram for Example 1 upon focusing on an object point at infinity.
Figure 5B:
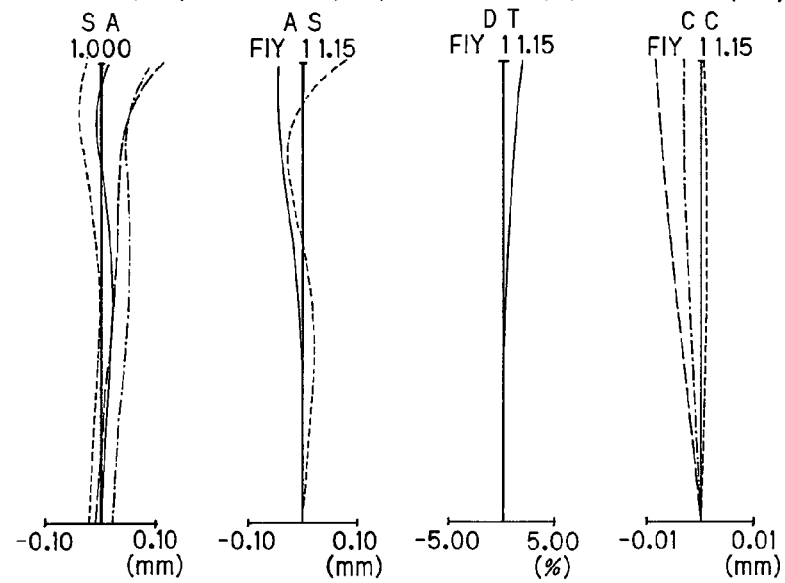
Figure 5C:
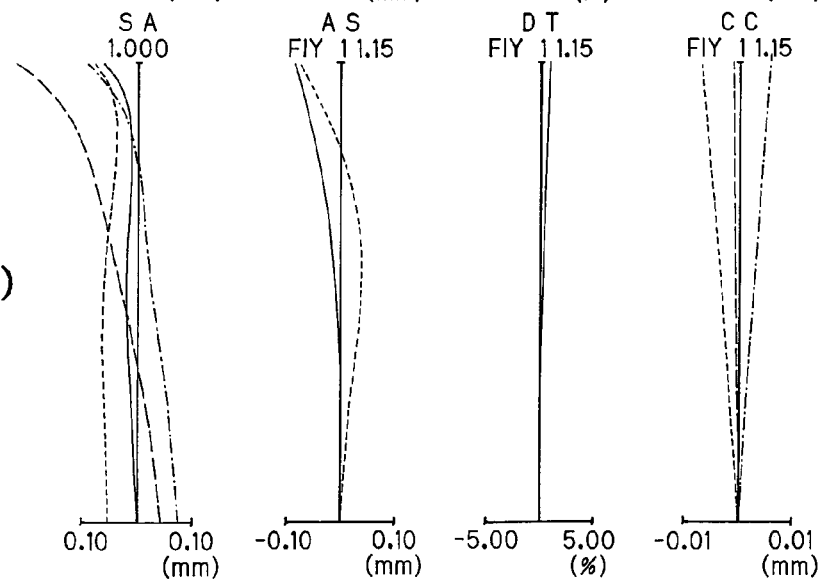
Figure 6A:
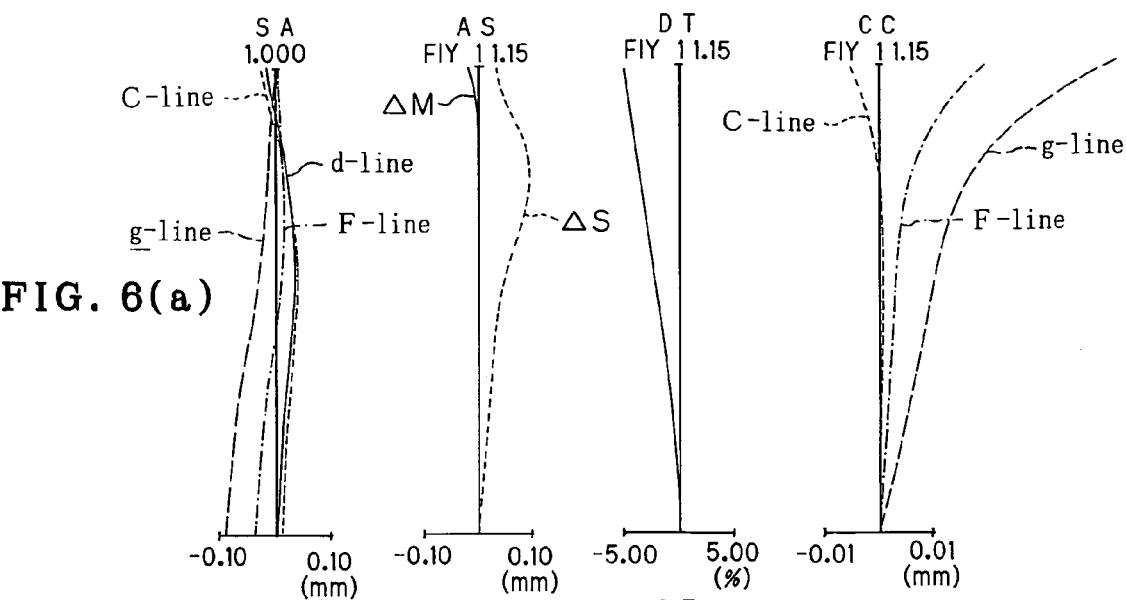
FIG. 6 is an aberration diagram for Example 1 upon focusing on a subject distance of 25 cm.
Figure 6B:
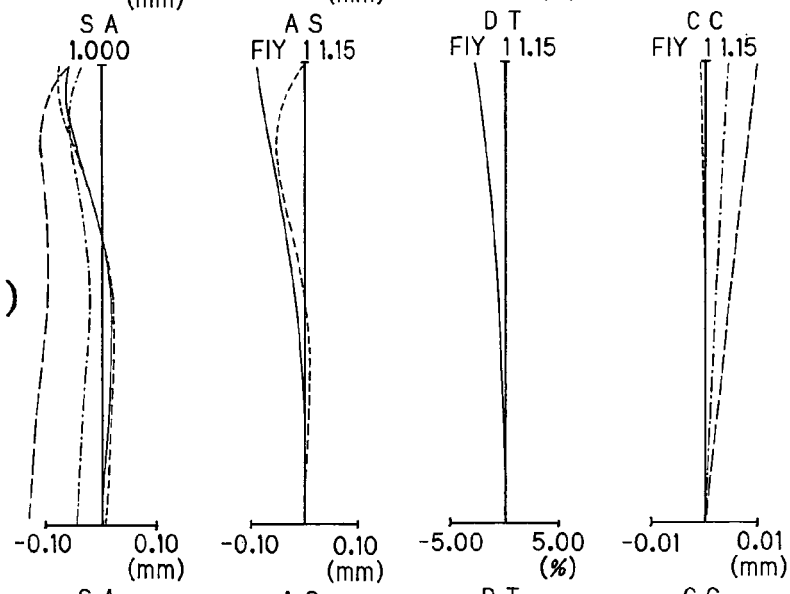
Figure 6C:
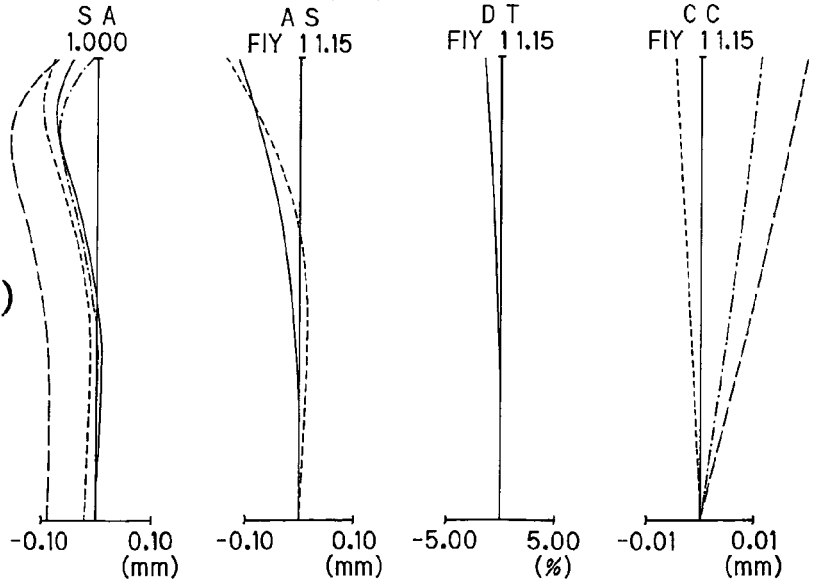
Figure 7A:
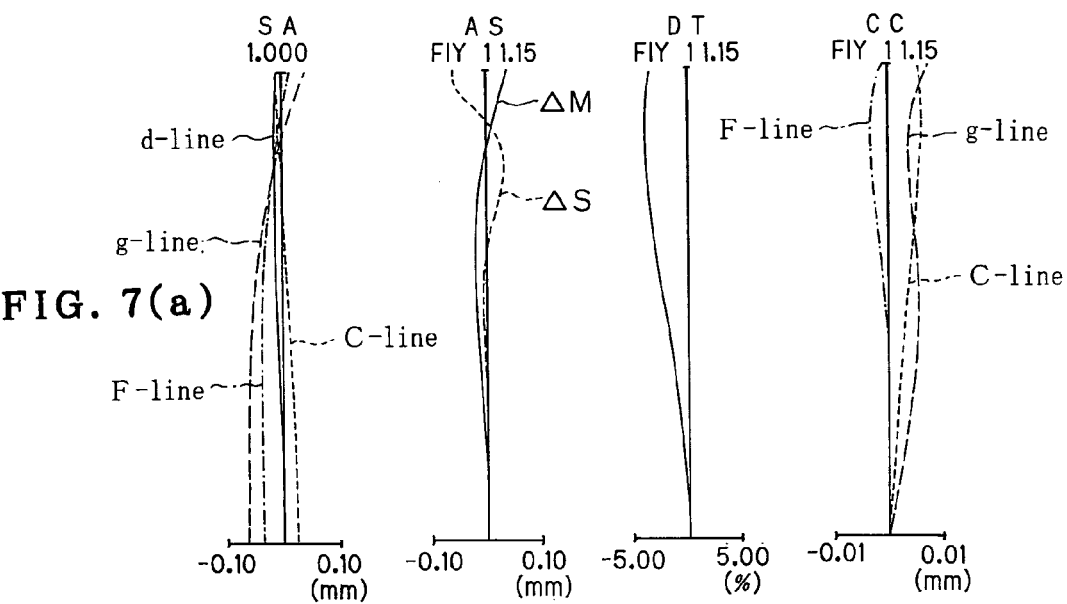
FIG. 7 is an aberration diagram for Example 2 upon focusing on an object point at infinity.
Figure 7B:
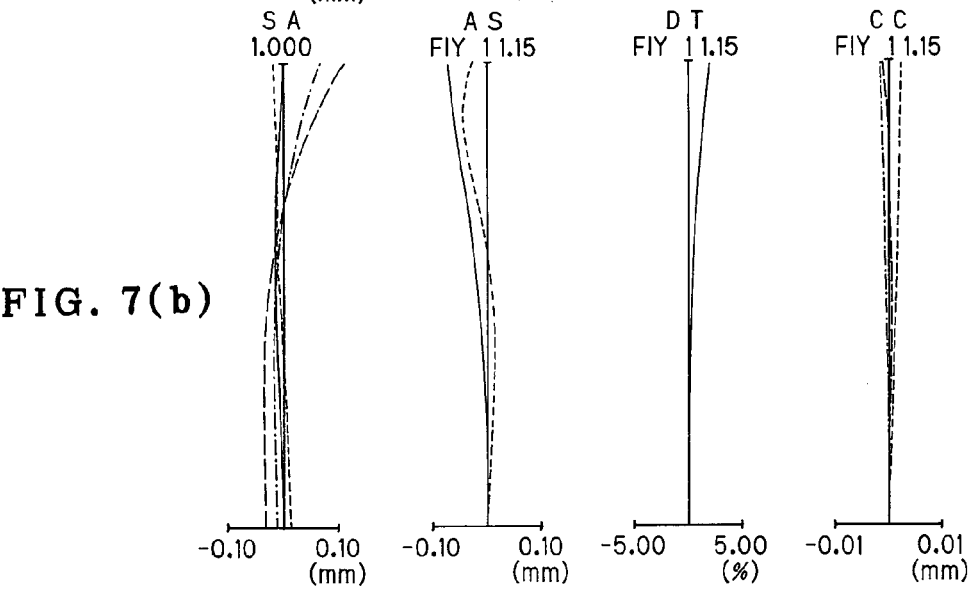
Figure 7C:
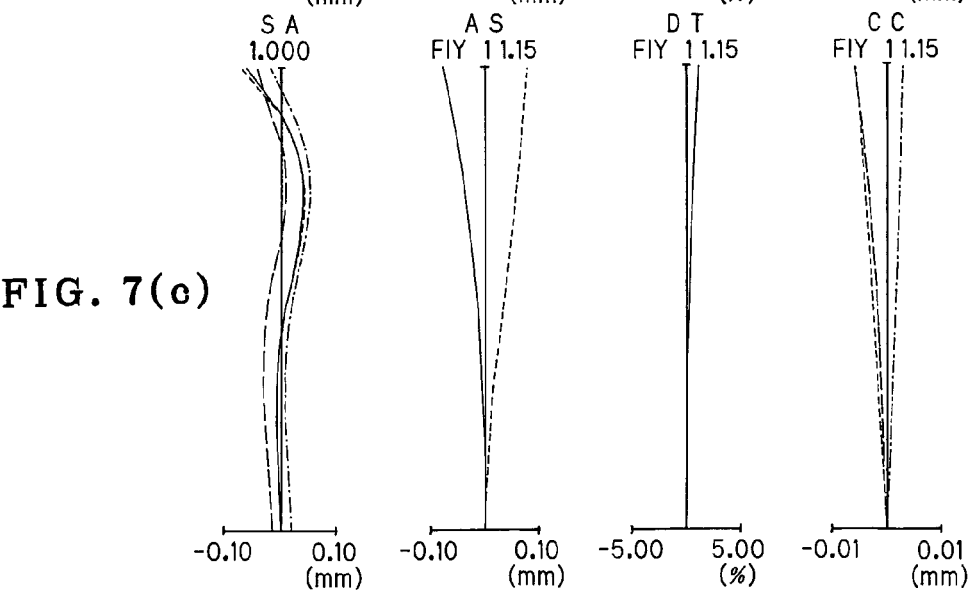
Figure 8A:
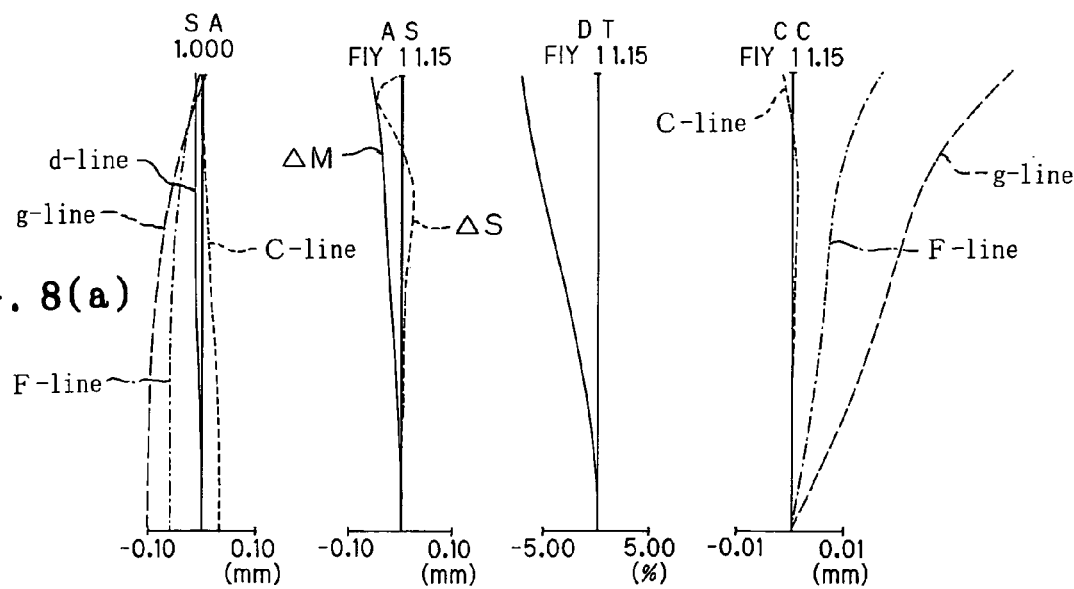
FIG. 8 is an aberration diagram for Example 2 upon focusing on a subject distance of 25 cm.
Figure 8B:
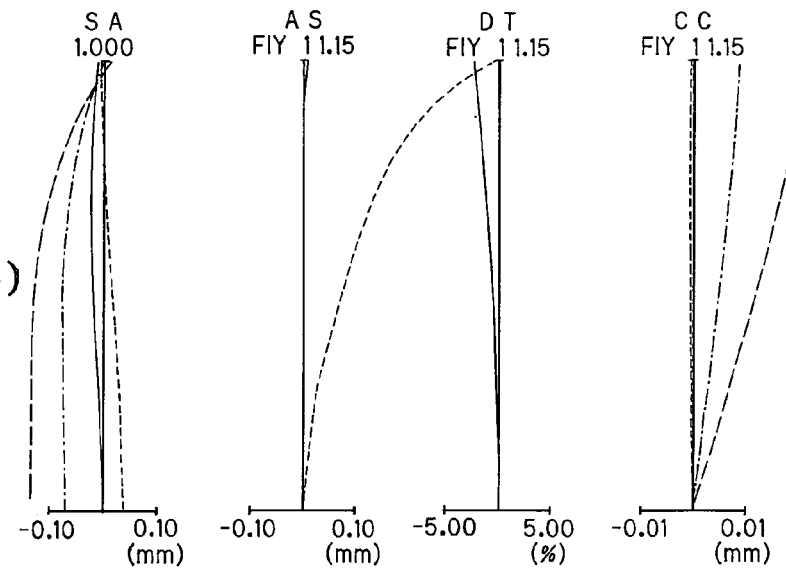
Figure 8C:
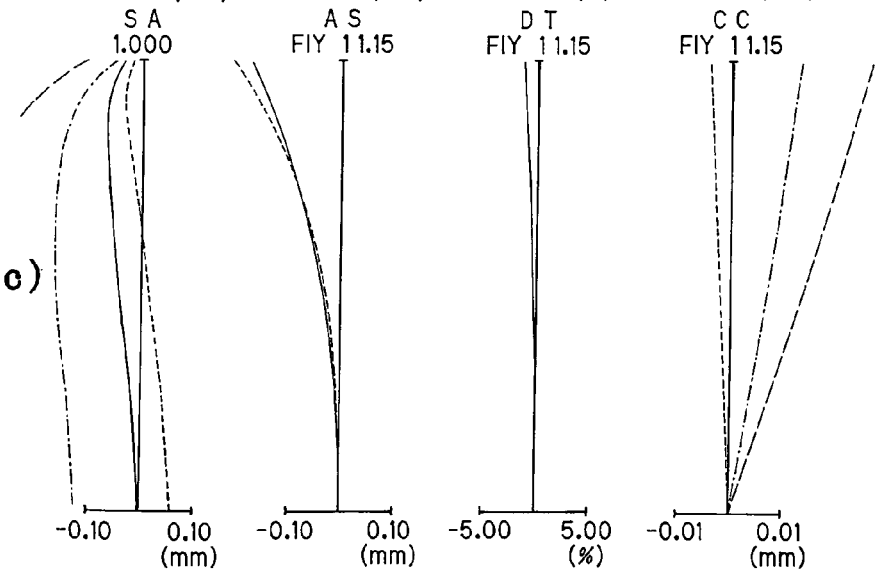
Figure 9A:
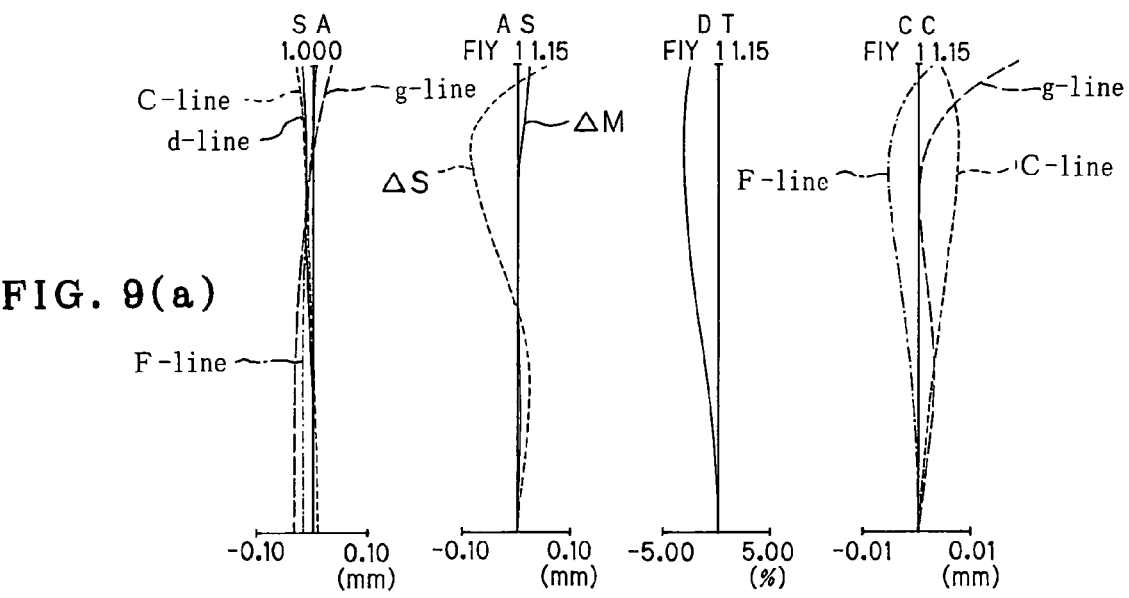
FIG. 9 is an aberration diagram for Example 3 upon focusing on an object point at infinity.
Figure 9B:
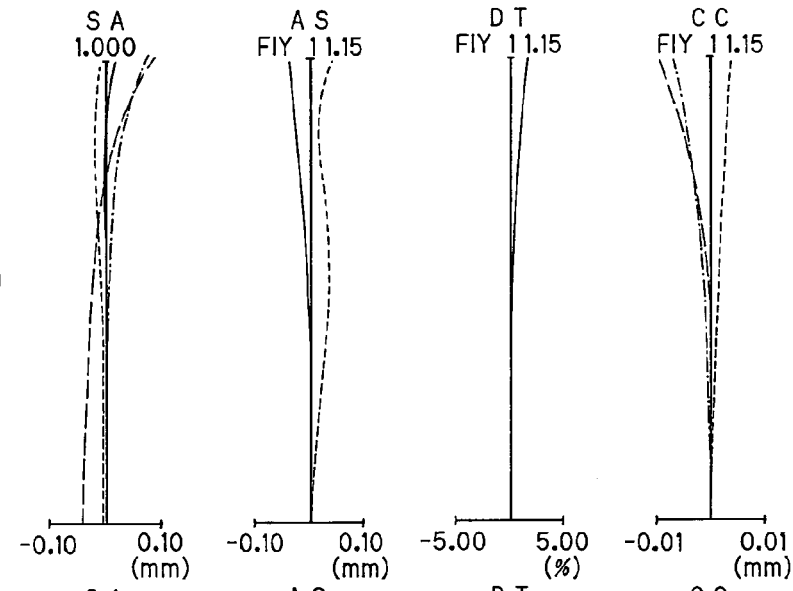
Figure 9C:
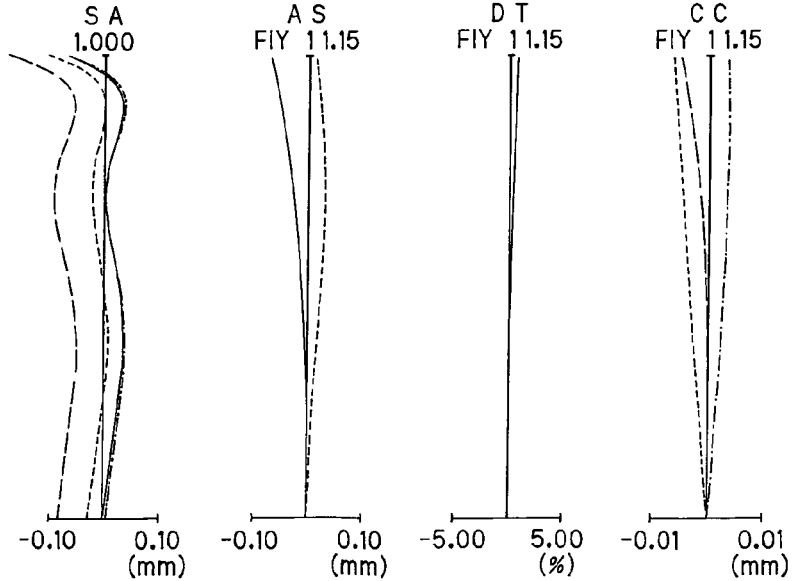
Figure 11A:
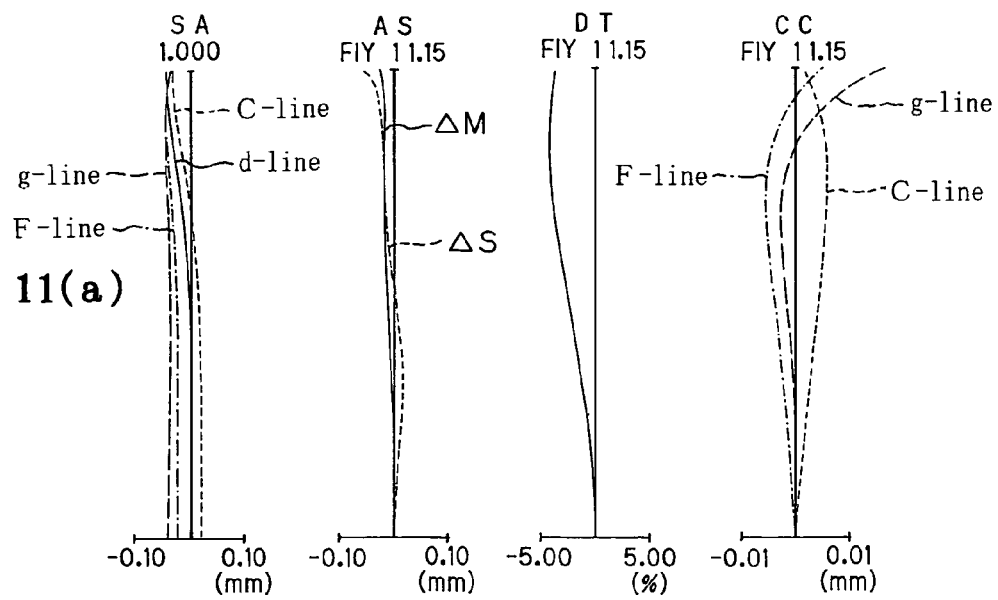
FIG. 11 is an aberration diagram for Example 4 upon focusing on an object point at infinity.
Figure 11B:
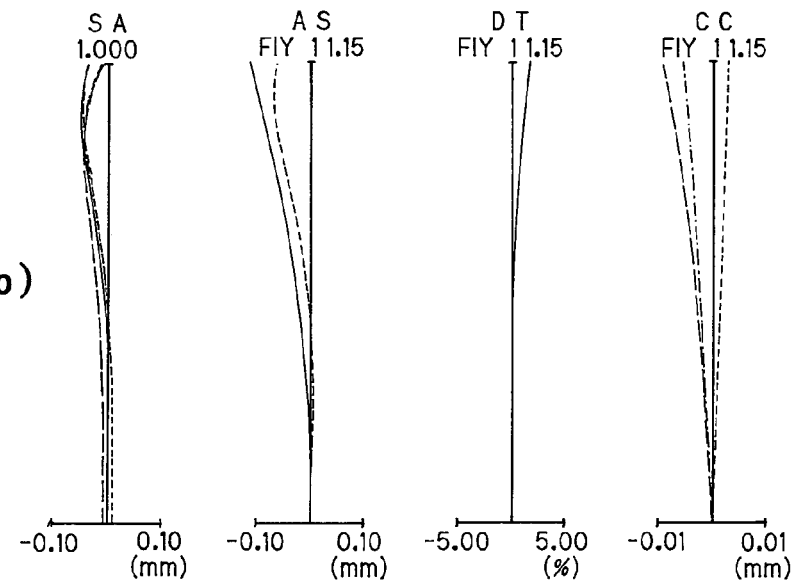
Figure 11C:
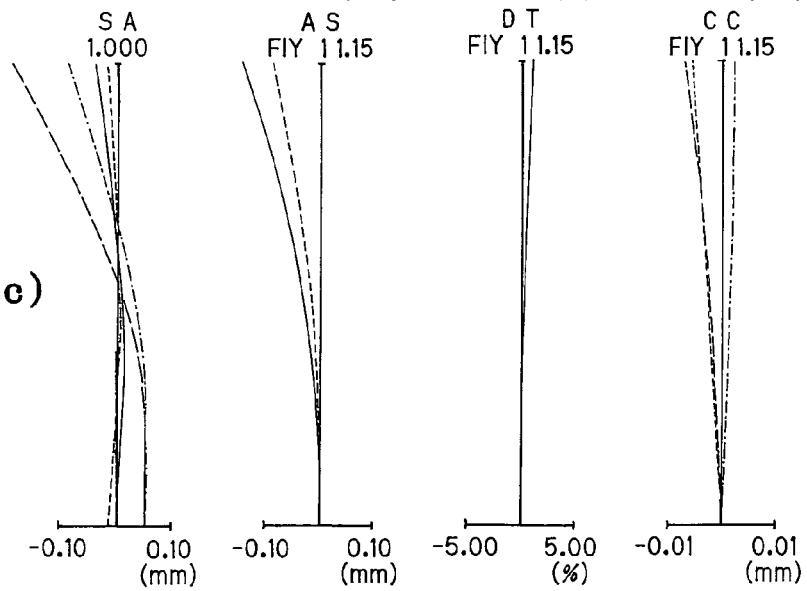
Figure 12A:
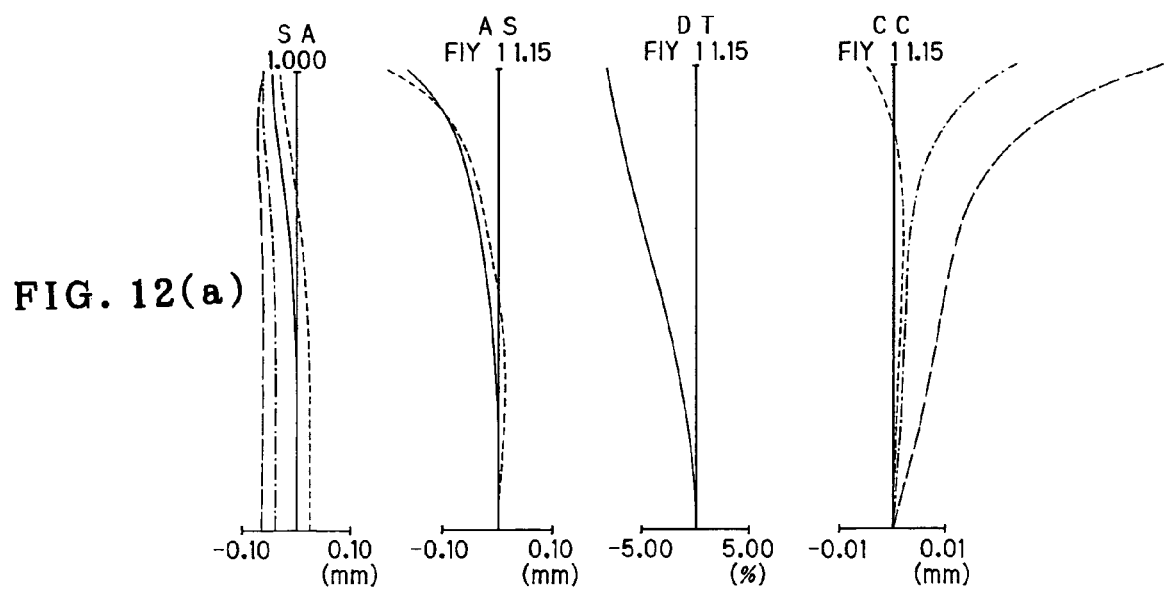
FIG. 12 is an aberration diagram for Example 4 upon focusing on a subject distance of 25 cm.
Figure 12B:
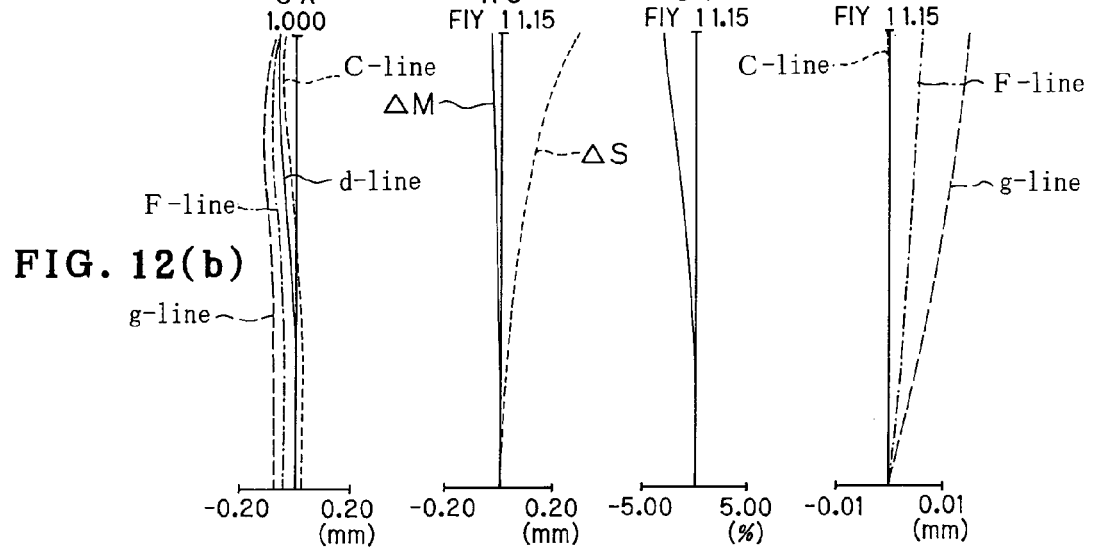
Figure 12C:
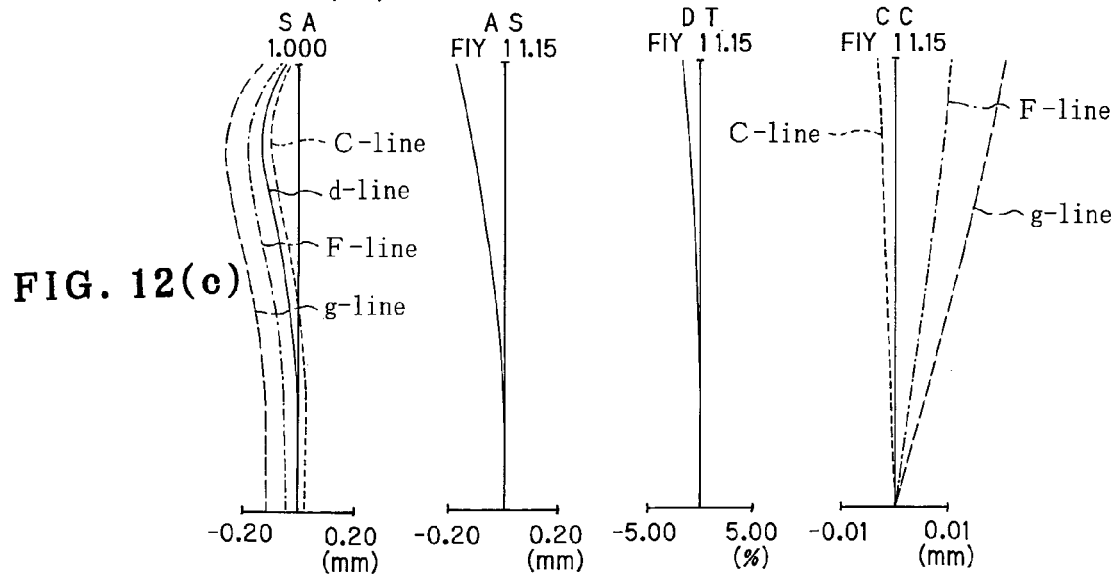

FIG. 5 is an aberration diagram for Example 1 upon focusing on an object point at infinity, and FIG. 6 is an aberration diagram for Example 1 upon focusing on a subject distance of 25 cm as measured from the image plane. FIGS. 7 and 8 are similar aberration diagrams for Example 2; FIGS. 9 and 10 are similar aberration diagrams for Example 3; and FIGS. 11 and 12 are similar aberration diagrams for Example 4. These aberration diagrams are indicative of spherical aberration (SA), astigmatism (AS), distortion (DT) and chromatic aberration of magnification (CC) at the wide-angle end (a), in the intermediate setting (b), and at the telephoto end (c). In each diagram, 1.000 at ordinate for spherical aberration (SA) is indicative of the maximum aperture, and "FIY" in other aberrations is indicative of an image height in mm.

Set out below are the values of conditions (1) and (2) in each example.

| Condition | $f_2/f_1$ | $f_4/f_3$ |
|---|---|---|
| Ex. 1 | −0.114 | 0.145 |
| Ex. 2 | −0.121 | 0.416 |
| Ex. 3 | −0.131 | 0.345 |
| Ex. 4 | −0.119 | 0.301 |

Figure 13:
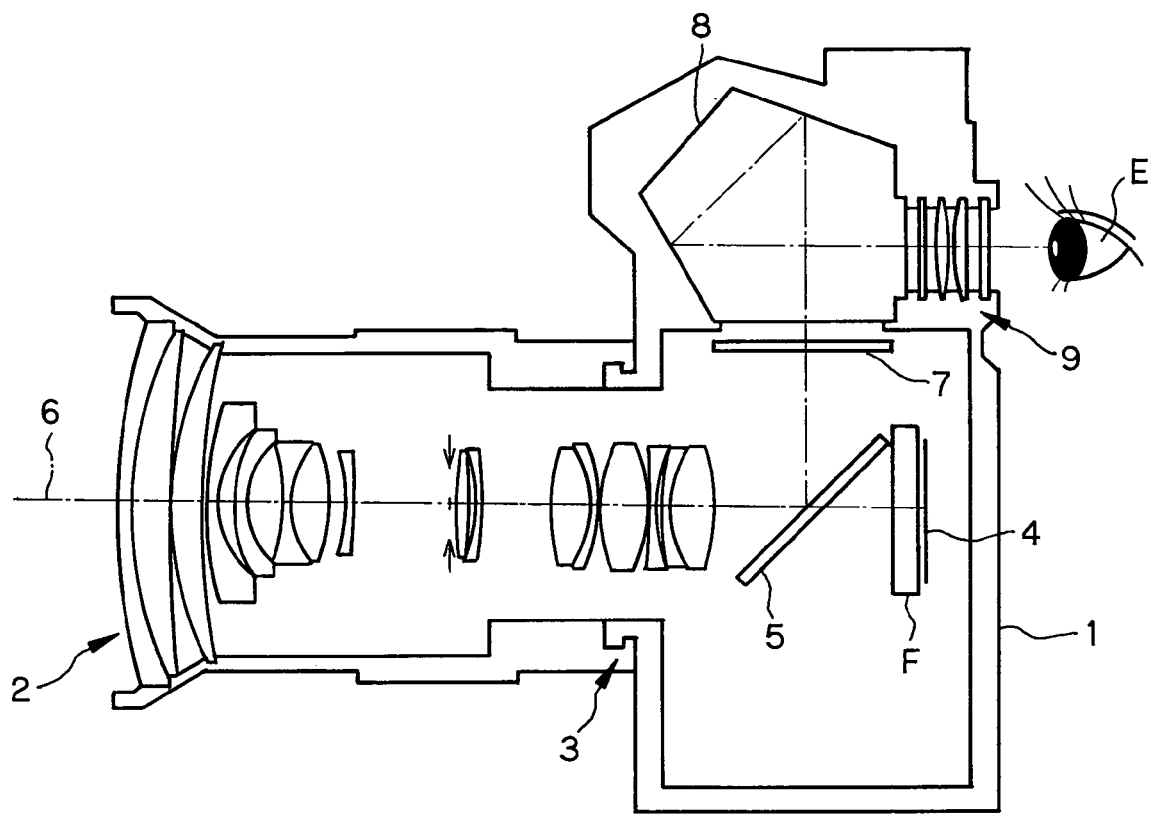
FIG. 13 is a sectional view of a single-lens reflex camera with the zoom lens of the invention used as an interchangeable lens.

FIG. 13 is illustrative in section of a single-lens reflex camera operating as an electronic imaging apparatus with the inventive zoom lens incorporated in it and a small-format CCD, CMOS or the like used as an imaging device. In FIG. 13, reference numeral 1 is a single-lens reflex camera, 2 a taking lens system located within a lens barrel comprising a zooming mechanism and a focusing mechanism, and 3 a lens barrel mount that makes the taking lens system 2 attachable to or detachable from the single-lens reflex camera 1. For this mount, a mount of the screw type or a mount of the bayonet type may be used. In the example here, the screw type mount is used.

Reference numeral 4 is indicative of an image device plane, 5 a quick return mirror interposed between the lens system and the image device plane 4 on a light path 6 through the taking lens system 2, 7 a finder screen located in a path of light reflected off the quick return mirror 5, 8 a penta prism, 9 a finder, and E the eye of an observer (eye point).

For the taking lens system 2 of the single-lens reflex camera 1 of such construction, for instance, the inventive zoom lens shown in each of Examples 1 to 4 is used.

According to the present invention as described above, it is possible to achieve a zoom lens that has such higher performance as represented by a longer back focus, a higher zoom ratio, a larger aperture ratio, and a shorter closest object distance as an interchangeable lens for a single-lens reflex type digital camera.

I claim:

1. A zoom lens which comprises, in order from an object side thereof,
a first lens group having positive refracting power,
a second lens group having negative refracting power,
a third lens group having positive refracting power, and
a fourth lens group having positive refracting power,
wherein zooming from a wide-angle end to a telephoto end is implemented by changing a space between the respective lens groups;
upon zooming from said wide-angle end to said telephoto end,
a space between said first lens group and said second lens group grows wide,
a space between said second lens group and said third lens group becomes narrow,
a space between said third lens group and said fourth lens group becomes narrow,
said first lens group, said third lens group, and said fourth lens group moves toward the object side only, and
said second lens group moves toward the object side after moving to an image plane side;
said second lens group and said fourth lens group each have at least one aspheric surface; and
said second lens group has at least one negative lens made of a material that satisfies the following multiple conditions, and said fourth lens group has at least one positive lens that satisfies the following multiple conditions:

$$n_d > 1.4 \quad (3)$$

$$\nu_d > 80 \quad (4)$$

where $n_d$ is a d-line refractive index, and
$\nu_d$ is an Abbe constant.

2. A zoom lens which comprises, in order from an object side thereof,
a first lens group having positive refracting power,
a second lens group having negative refracting power,
a third lens group having positive refracting power, and
a fourth lens group having positive refracting power,
wherein zooming from a wide-angle end to a telephoto end is implemented by changing a space between the respective lens groups;
upon zooming from said wide-angle end to said telephoto end,
a space between said first lens group and said second lens group grows wide,
a space between said second lens group and said third lens group becomes narrow,
a space between said third lens group and said fourth lens group becomes narrow,
said first lens group, said third lens group, and said fourth lens group moves toward the object side only,
said second lens group moves toward the object side after moving to an image plane side; and
said second lens group and said fourth lens group each have at least one aspheric surface, with satisfaction of the following conditions:

$$0.1 < |f_2/f_1| < 0.14 \quad (1)$$

$$0.1 < |f_4/f_3| < 0.6 \quad (2)$$

where $f_i$ is a focal length of an i-th lens group;
wherein the zoom lens has an angle of view of 80° or greater at the wide-angle end and a zoom ratio of 4 or higher.

3. The zoom lens according to claim 1, which has an angle of view of 80° or greater at the wide-angle end and a zoom ratio of 4 or higher.

4. A zoom lens which comprises, in order from an object side thereof,
a first lens group having positive refracting power,
a second lens group having negative refracting power, a third lens group having positive refracting power, and a fourth lens group having positive refracting power, wherein zooming from a wide-angle end to a telephoto end is implemented by changing a space between the respective lens groups;

said second lens group comprises a front unit having negative refracting power and a rear unit having negative refracting power; and focusing on a nearby subject is implemented by movement of the second lens group in an optical axis direction with a change in a space between said front unit and said rear unit;

wherein the zoom lens has an angle of view of 80° or greater at the wide-angle end and a zoom ratio of 4 or higher.

5. The zoom lens according to claim 2, wherein said second lens group comprises a negative lens that is located nearest to the object side and has at least one aspheric surface, and a negative lens that is located nearest to the image plane side and has at least one aspheric surface.

6. The zoom lens according to claim 1, wherein said second lens group comprises a negative lens that is located nearest to the object side and has at least one aspheric surface, and a negative lens that is located nearest to the image plane side and has at least one aspheric surface.

7. The zoom lens according to claim 4, wherein said second lens group comprises a negative lens that is located nearest to the object side and has at least one aspheric surface, and a negative lens that is located nearest to the image plane side and has at least one aspheric surface.

8. A zoom lens which comprises, in order from an object side thereof, a first lens group having positive refracting power, a second lens group having negative refracting power, a third lens group having positive refracting power, and a fourth lens group having positive refracting power, wherein zooming from a wide-angle end to a telephoto end is implemented by changing a space between the respective lens groups;

upon zooming from said wide-angle end to said telephoto end, a space between said first lens group and said second lens group grows wide, a space between said second lens group and said third lens group becomes narrow, a space between said third lens group and said fourth lens group becomes narrow, said first lens group, said third lens group, and said fourth lens group moves toward the object side only, said second lens group moves toward the object side after moving to an image plane side; and said second lens group and said fourth lens group each have at least one aspheric surface, with satisfaction of the following conditions:

$$0.1 < |f_2/f_1| < 0.14 \tag{1}$$

$$0.1 < |f_4/f_3| < 0.6 \tag{2}$$

where $f_i$ is a focal length of an i-th lens group;

wherein said second lens group has at least one negative lens made of a material that satisfies the following multiple conditions, and said fourth lens group has at least one positive lens that satisfies the following multiple conditions:

$$n_d > 1.4 \tag{3}$$

$$\nu_d > 80 \tag{4}$$

where $n_d$ is a d-line refractive index, and $\nu_d$ is an Abbe constant.

9. The zoom lens according to claim 2, wherein said second lens group comprises a front unit having negative refracting power and a rear unit having negative refracting power; and focusing on a nearby subject is implemented by movement of the second lens group in an optical axis direction with a change in a space between said front unit and said rear unit.

10. The zoom lens according to claim 1, wherein said second lens group comprises a front unit having negative refracting power and a rear unit having negative refracting power; and focusing on a nearby subject is implemented by movement of the second lens group in an optical axis direction with a change in a space between said front unit and said rear unit.

11. The zoom lens according to claim 8, wherein said second lens group comprises a front unit having negative refracting power and a rear unit having negative refracting power; and focusing on a nearby subject is implemented by movement of the second lens group in an optical axis direction with a change in a space between said front unit and said rear unit.

* * * * *